INVENTORS
FRED D. MARASSO
ROBERT E. RADEMACHER
BY
*Bradley Cohn*
ATTORNEY

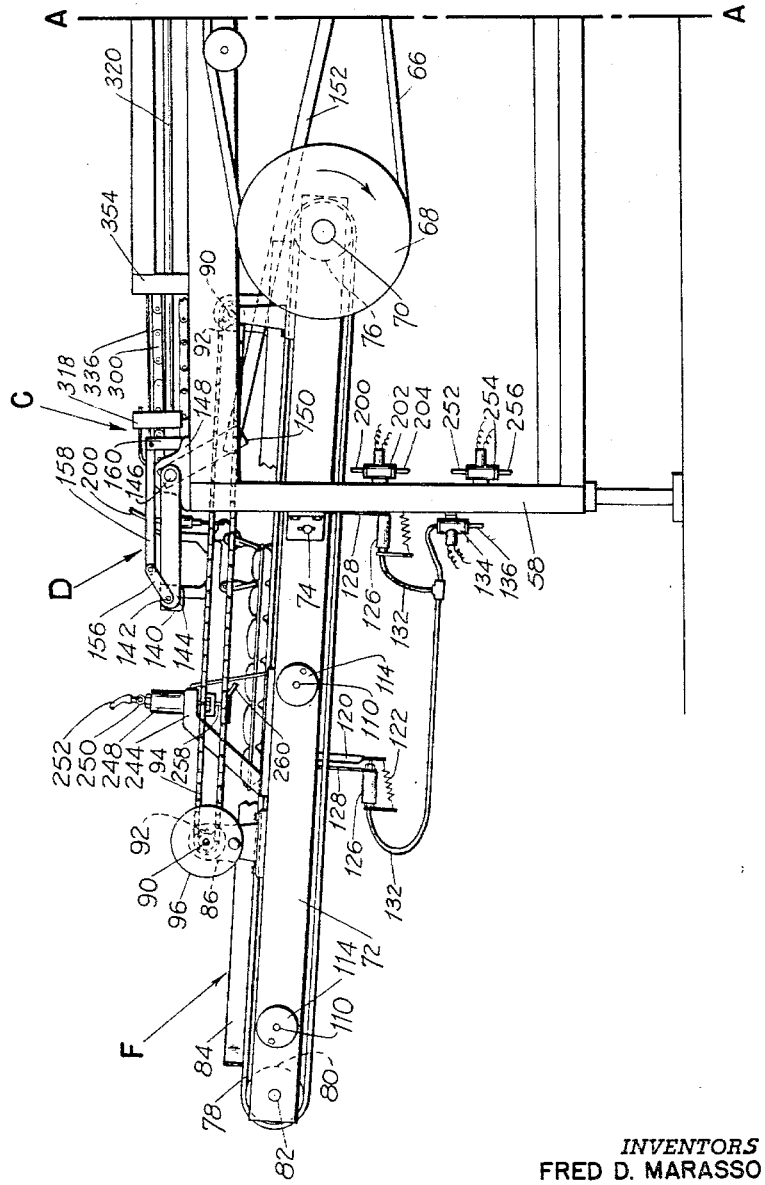

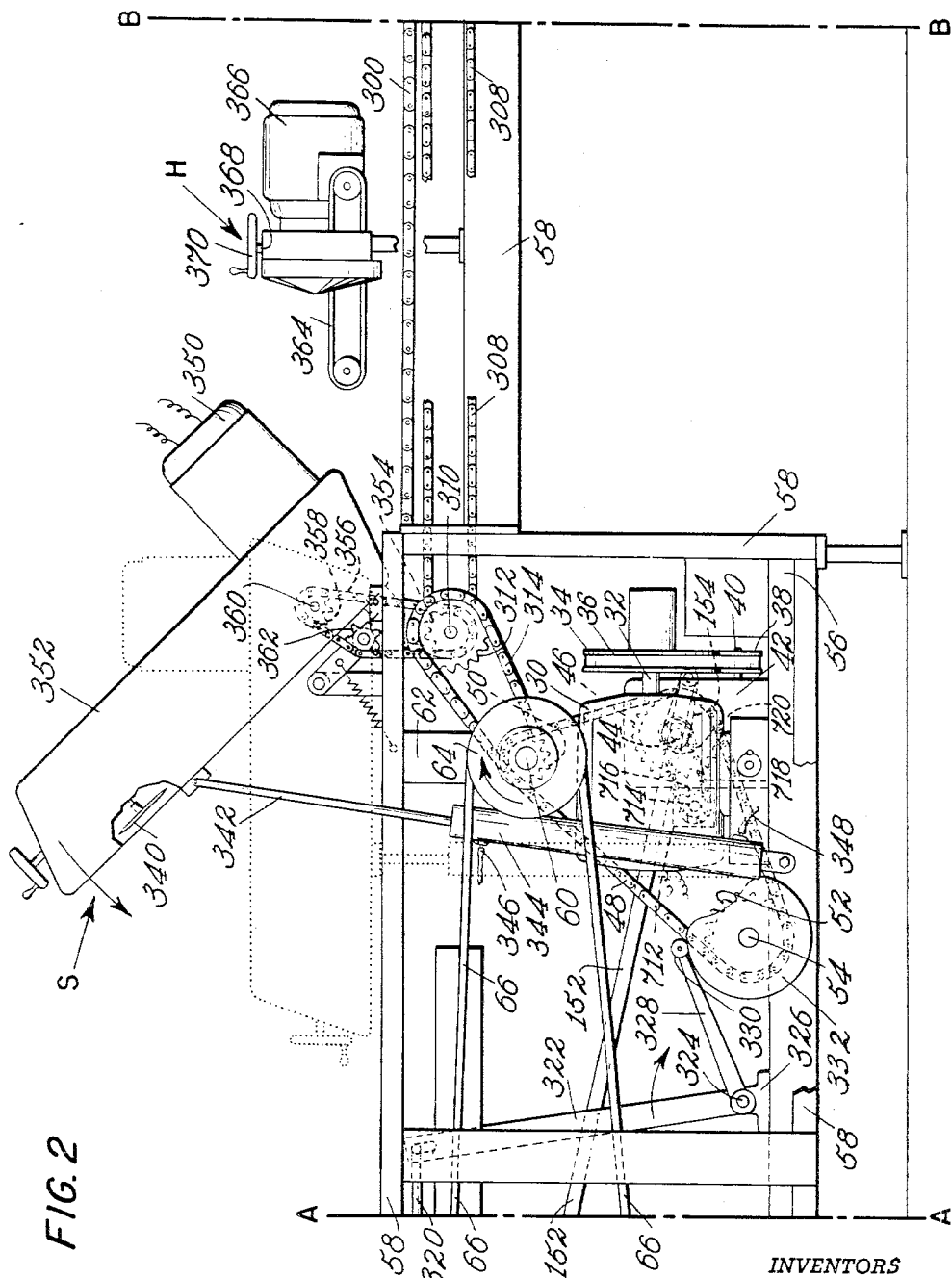

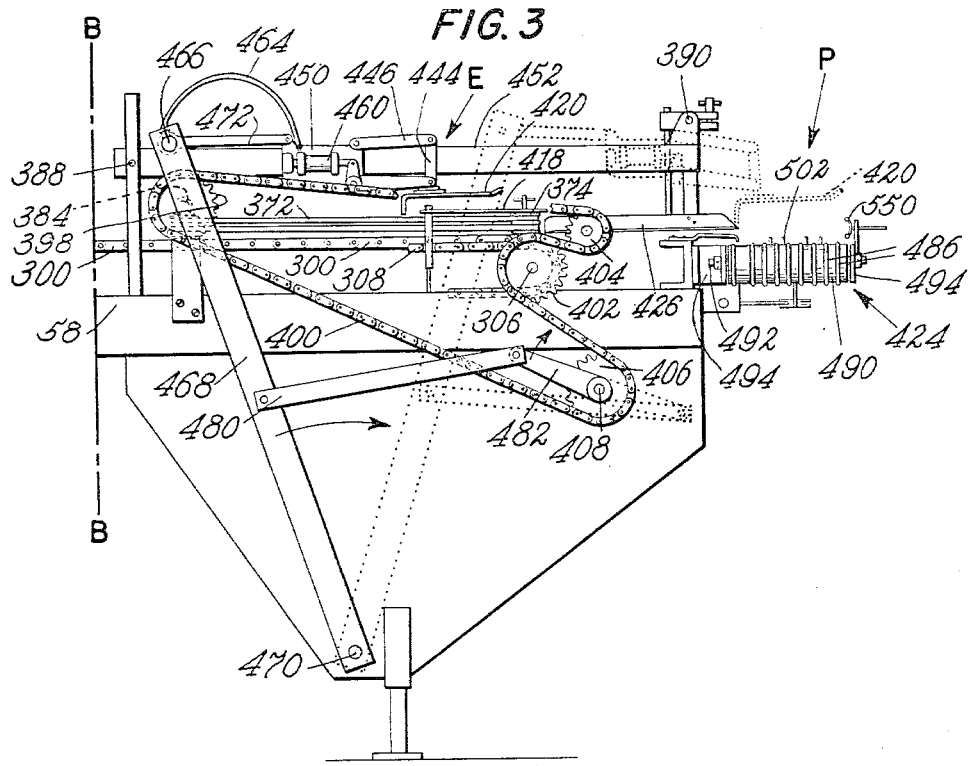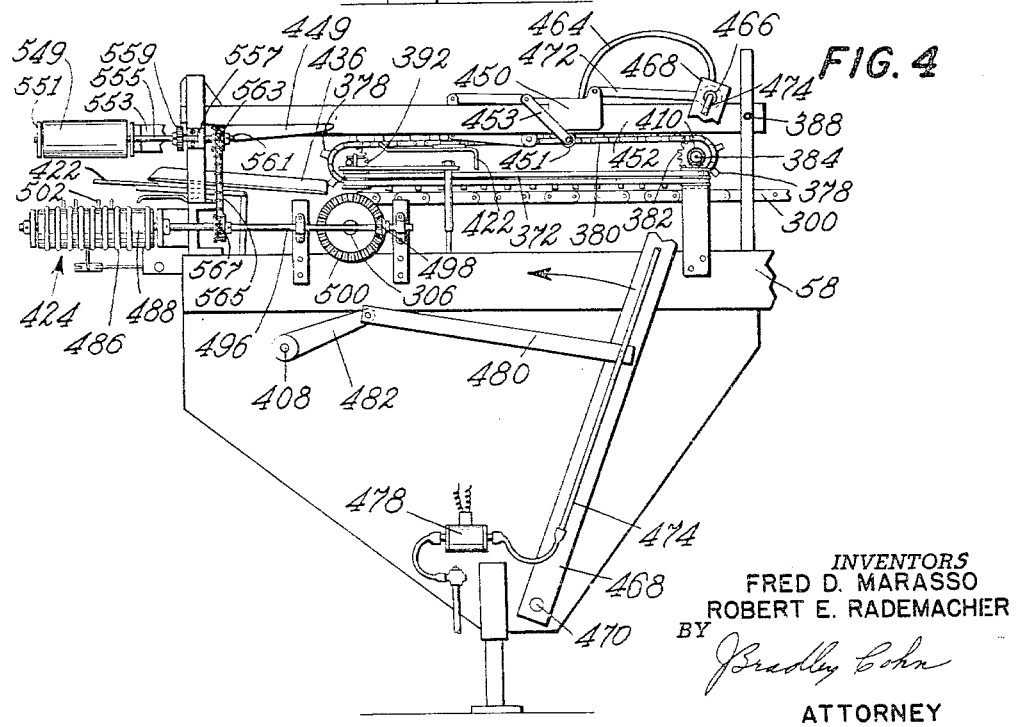

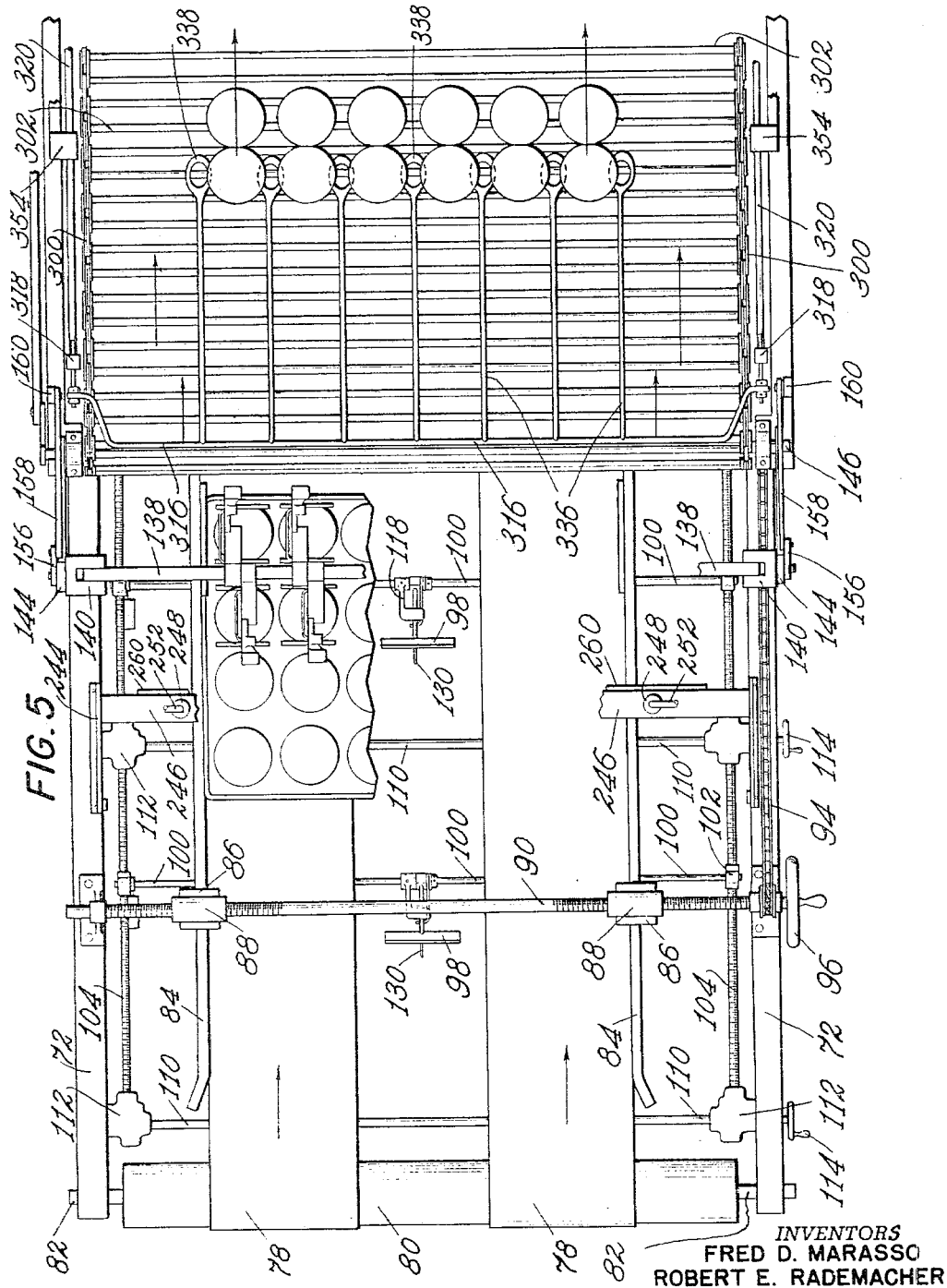

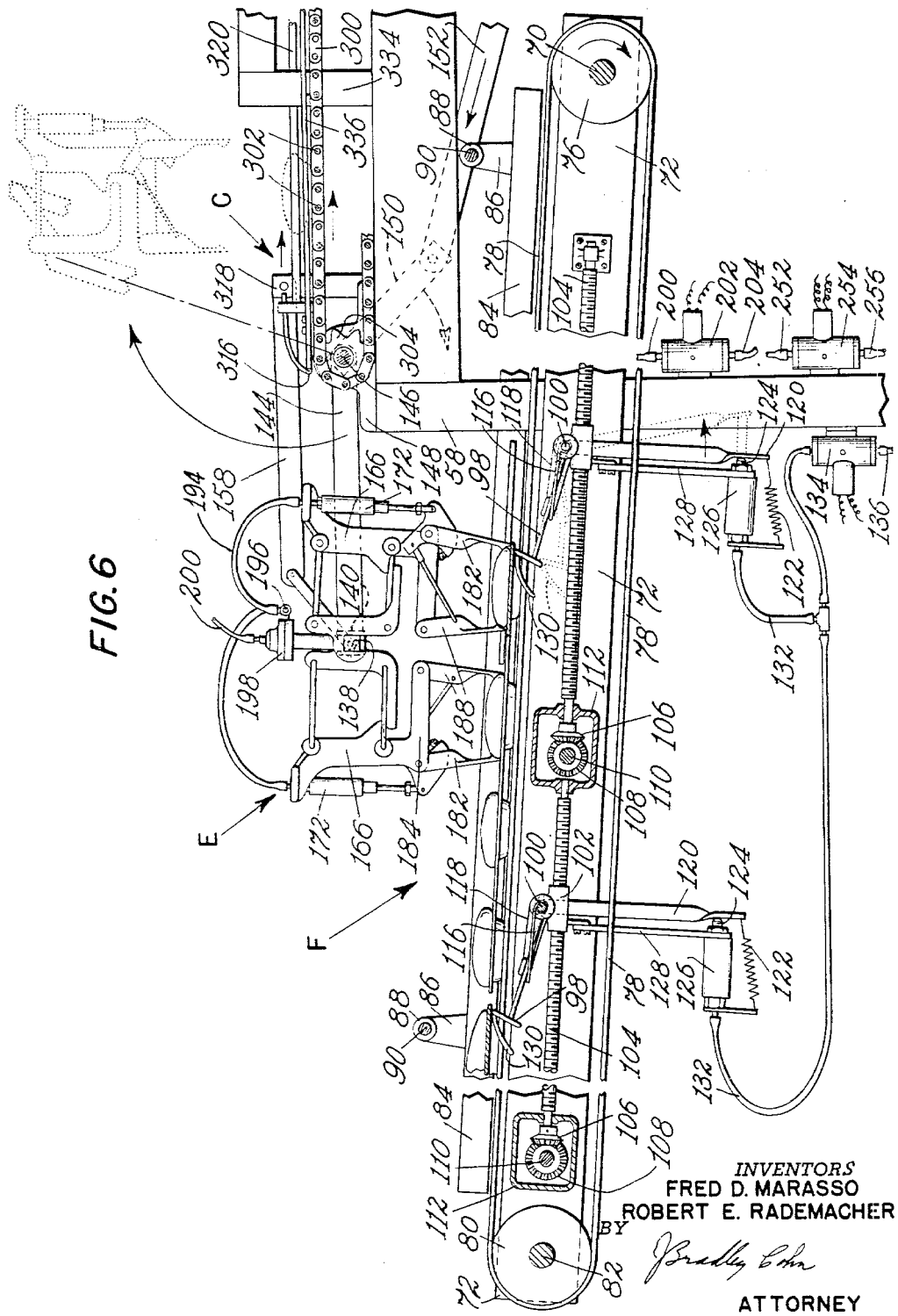

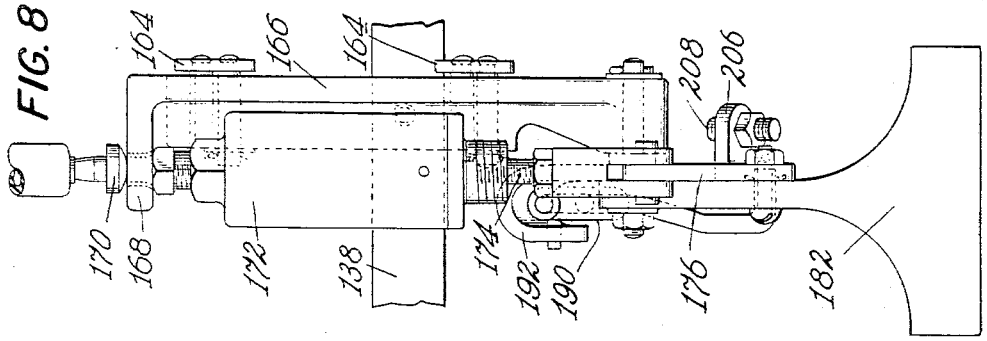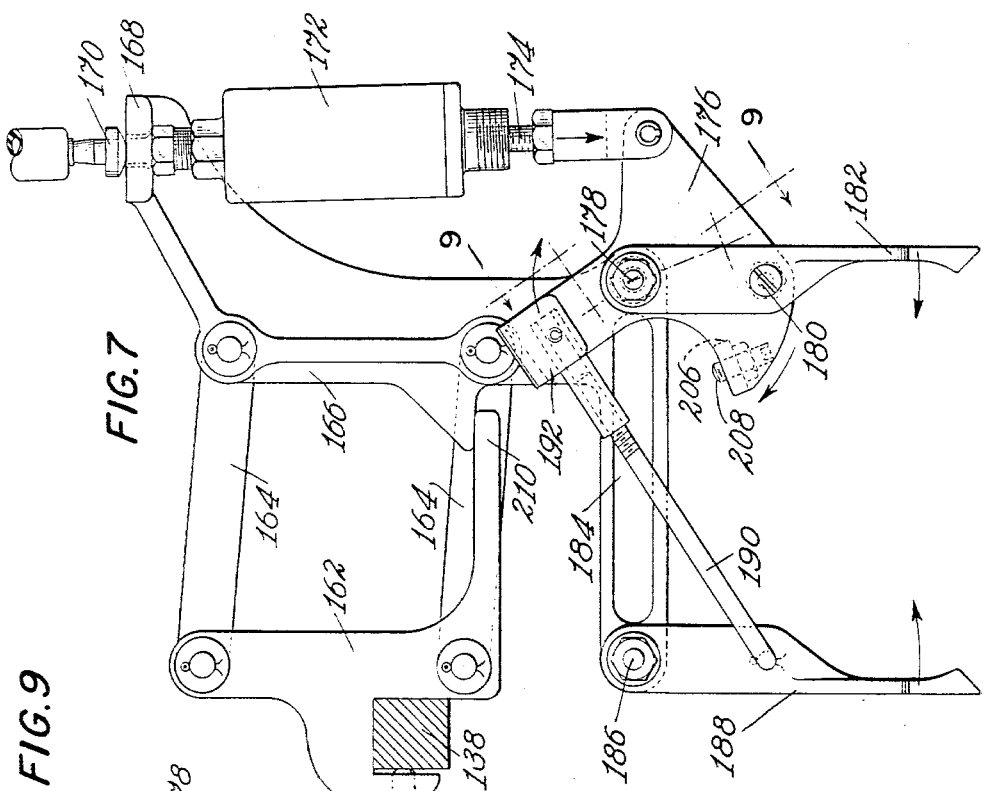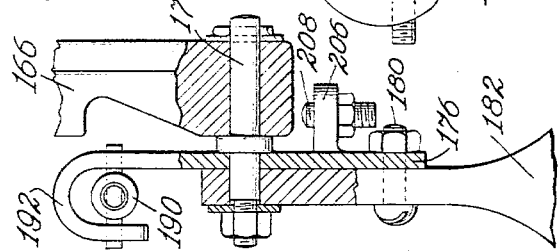

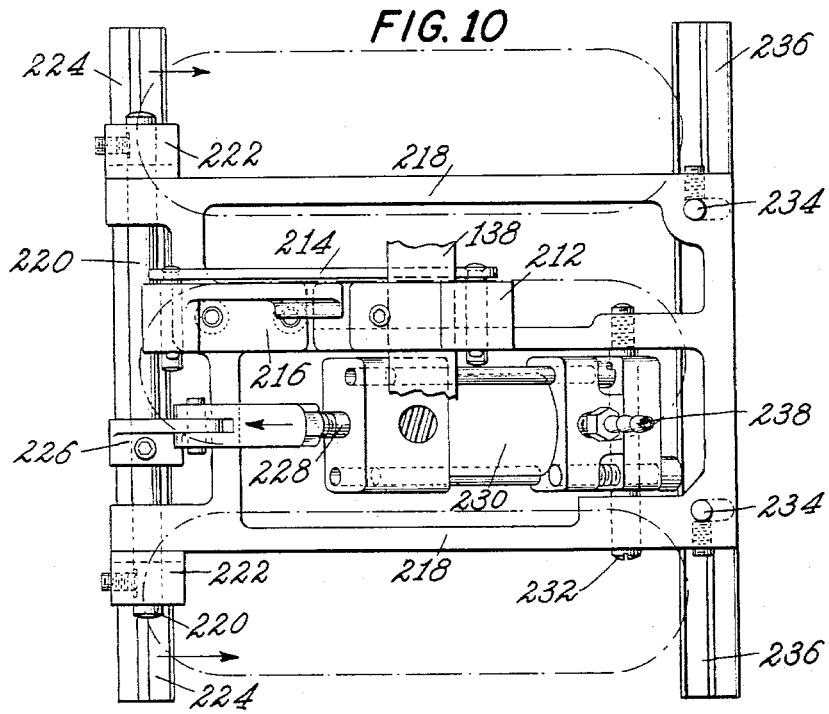
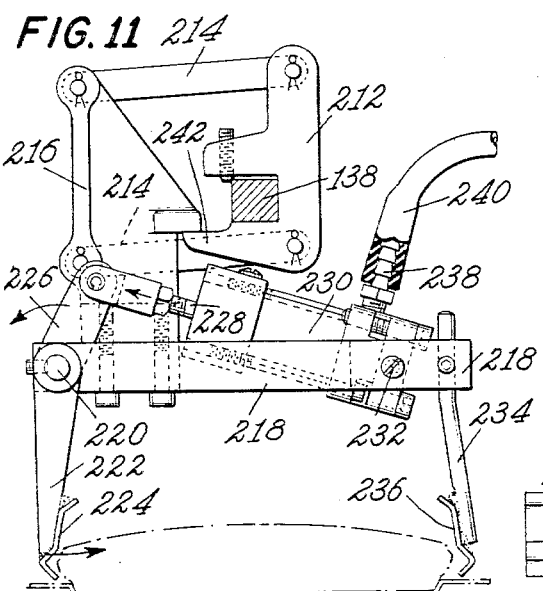
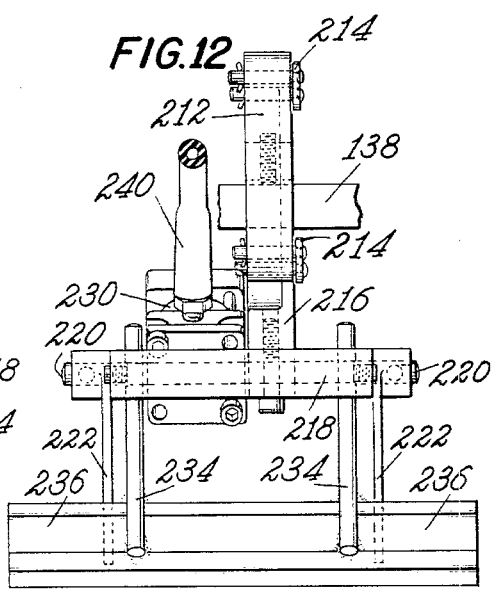
INVENTORS
FRED D. MARASSO
ROBERT E. RADEMACHER
BY
ATTORNEY Jan. 18, 1966 F. D. MARASSO ETAL 3,229,597
CARTON DISPENSING AND FORMING APPARATUS
Original Filed Feb. 2, 1959 16 Sheets-Sheet 8

Jan. 18, 1966     F. D. MARASSO ETAL     3,229,597
CARTON DISPENSING AND FORMING APPARATUS
Original Filed Feb. 2, 1959     16 Sheets-Sheet 9
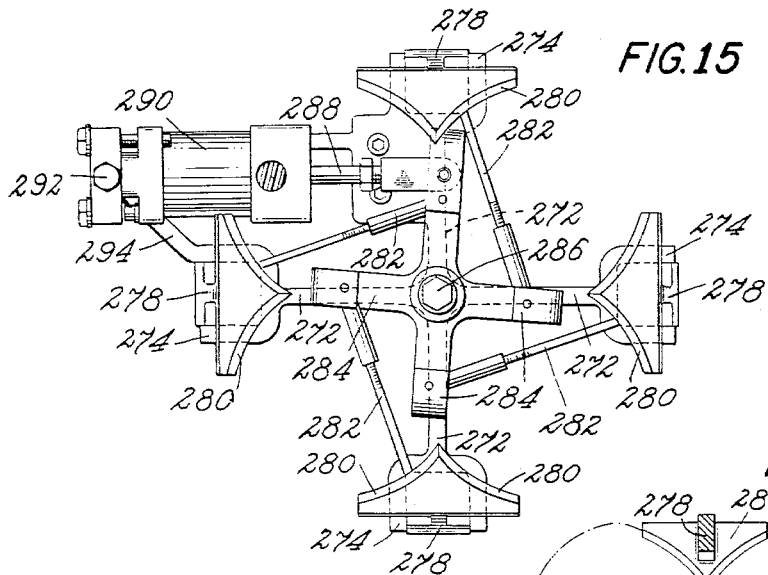
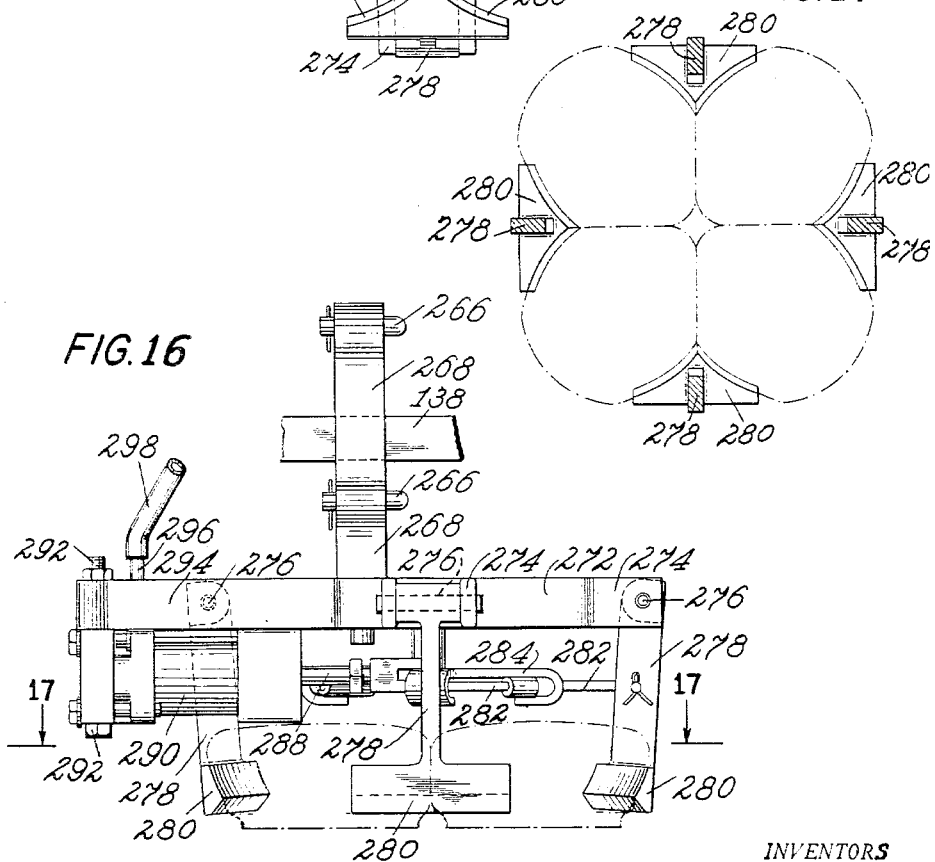
INVENTORS
FRED D. MARASSO
ROBERT E. RADEMACHER
BY
ATTORNEY

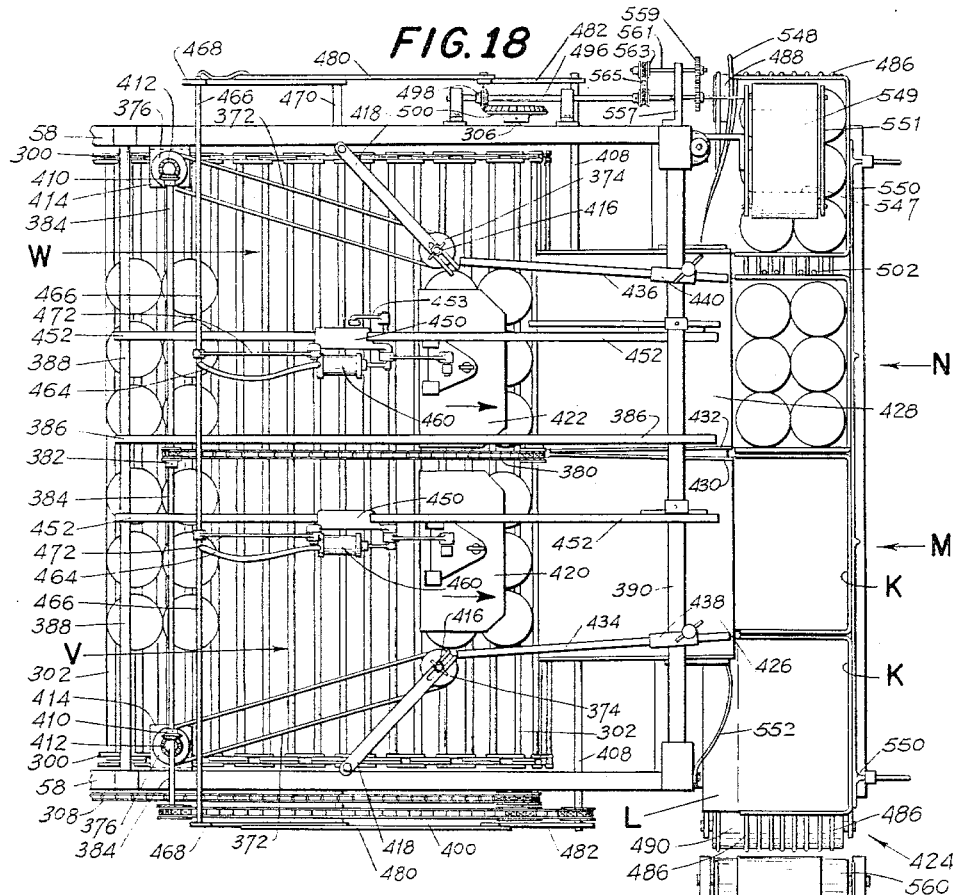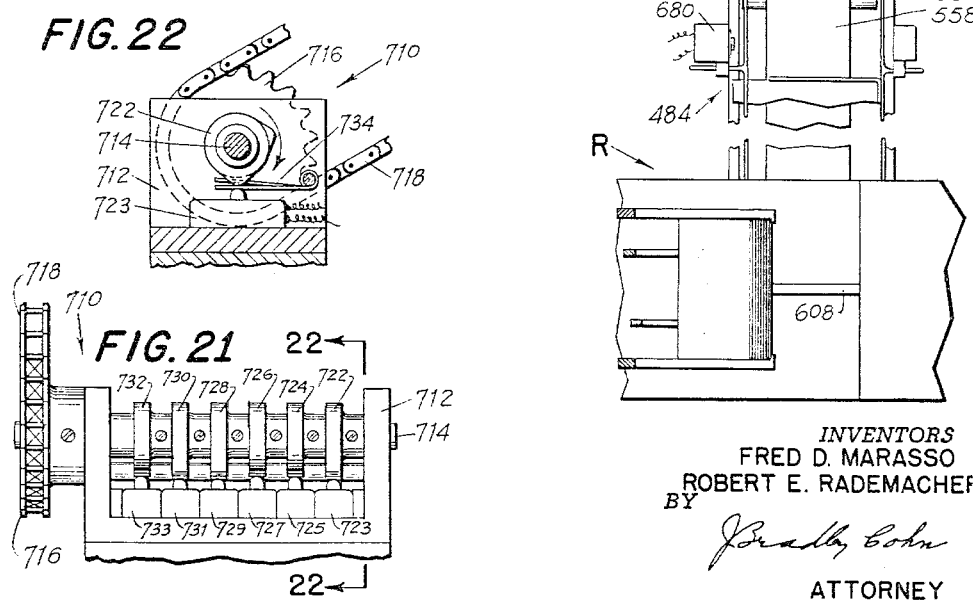

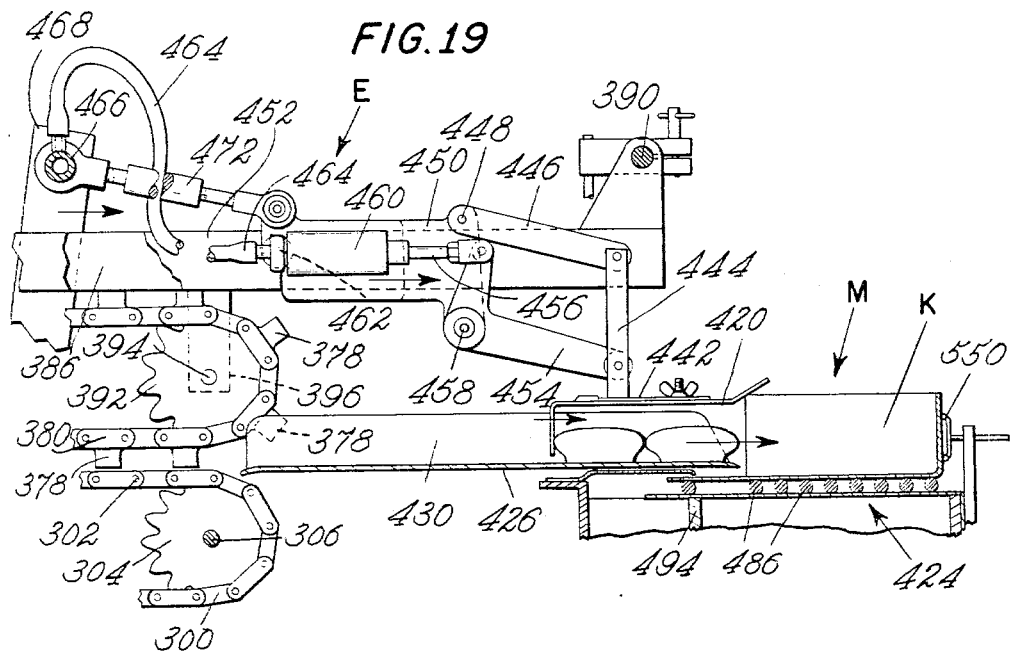
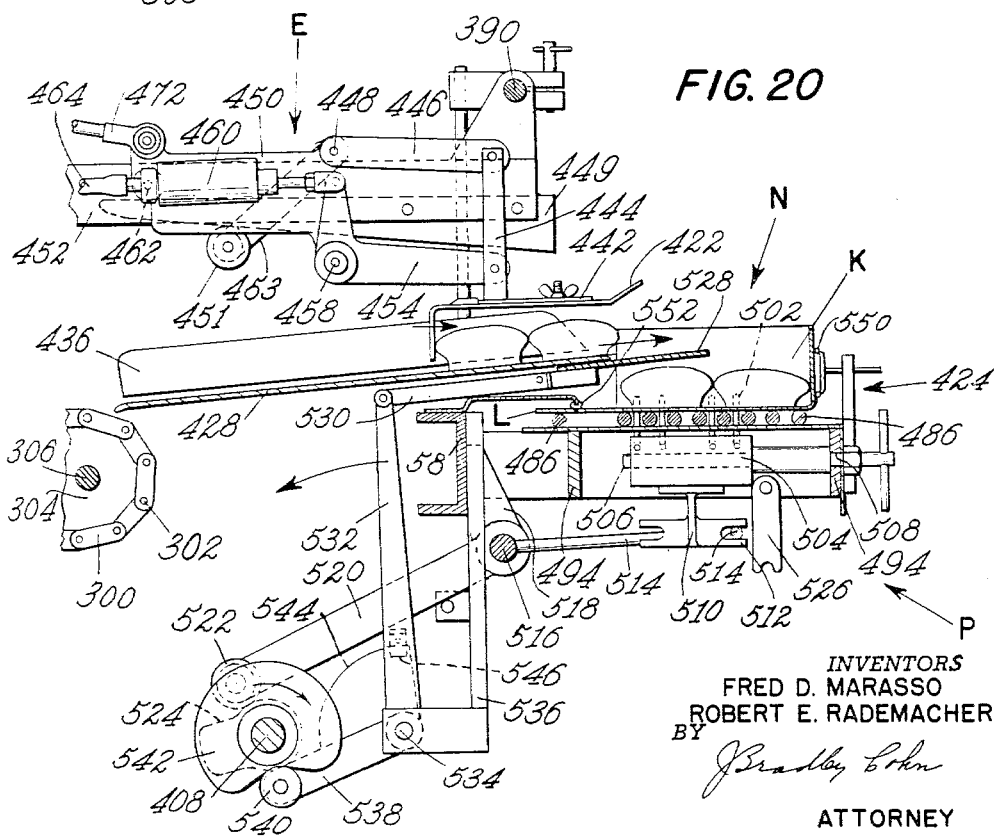

Jan. 18, 1966  F. D. MARASSO ETAL  3,229,597
CARTON DISPENSING AND FORMING APPARATUS
Original Filed Feb. 2, 1959  16 Sheets-Sheet 12

INVENTORS
FRED D. MARASSO
ROBERT E. RADEMACHER
BY
ATTORNEY

INVENTORS
FRED D. MARASSO
ROBERT E. RADEMACHER
BY
ATTORNEY

INVENTORS
FRED D. MARASSO
ROBERT E. RADEMACHER
BY
ATTORNEY

United States Patent Office 3,229,597
Patented Jan. 18, 1966

3,229,597
CARTON DISPENSING AND FORMING
APPARATUS
Fred D. Marasso and Robert E. Rademacher, Richmond, Va., assignors to American Machine & Foundry Company, a corporation of New Jersey
Original application Feb. 2, 1959, Ser. No. 790,420, now Patent No. 3,106,048, dated Oct. 8, 1963. Divided and this application Nov. 15, 1962, Ser. No. 237,939
2 Claims. (Cl. 93—53)

This application is a division of our copending application, Serial No. 790,420, filed February 2, 1959, now Patent No. 3,106,048, issued Oct. 8, 1963, and claim is made for all of the equitable and legal rights derivable therefrom.

This invention relates to handling and packaging of fragile articles and more particularly baked articles such as buns, rolls and the like.

Normally, bake pans have a plurality of pockets each generally containing one article. Generally the pockets are laterally spaced in rows in the baking container. Consequently, such pans may be conveyed along a conveyor thereby providing laterally spaced rows of endless length. Such baked articles must be removed from the pan and packaged for marketing. With certain specialty types of bun, such as hamburger buns and hot dog rolls, it is additionally necessary to slice them.

Heretofore, it has been necessary to perform the operation of depanning and cartoning manually. A further problem has been that where suitable slicing machines have been devised for halving the buns, nonetheless it was necessary to hand deposit the buns on a suitable conveyor for proper alignment into the slicing machines.

It is therefore an object of the invention to depan, align, slice and package buns on a single machine. It is an object of this invention to perform these multiple operations continuously and automatically on a unitary device.

It is a further object of this invention to provide a packaging device for use with a depanning member and a conveyor for delivering articles to a discharge station having a plurality of article feed positions, and including a first pusher member for moving a portion of the baked articles delivered to the discharge station into a carton at a first article feed position and second pusher member for moving the remainder of the baked articles on the conveyor into a carton at a second feed position, the pusher member at the second feed position being operative to dispense the articles in overlying relationship with articles moved into a carton at the first discharge station and positive support means over which articles at the second discharge station are moved by the second pusher member.

Another object of the present invention is to provide means for indexing a carton delivered to the discharge station from the first article feed position to a second article feed position.

Another object of this invention is to provide an article dispensing device provided with means for removing a folded carton blank from a source of supply and cam-actuated finger members for assembling the removed blank into a carton having one side open for receiving articles.

Another object of the invention is to provide a carton dispensing device provided with a suction member for extracting a folded blank from a source of supply and cam-actuated finger members for assembling the removed blank into a carton having a major side in open position for receiving articles.

It is an object of the invention to devise a novel carton and mechanism for readily delivering it from a magazine.

It is a further object of the invention to devise a novel carton in which articles may be fed sidewardly into the carton.

It is a further object to devise a novel carton suitable for slidingly receiving oriented baked articles.

The novel features which are believed to be characteristic of the invention are set forth with particularity in the appended claims. The invention, itself, however, both as to its organization and method of operation may be understood by reference to the following description taken in connection with the accompanying drawings, in which:

FIGS. 1, 2 and 3 when joined on line A—A and B—B illustrates a side elevation of the depanning, slicing, dispensing and packaging machine for baked goods;

FIG. 4 is a partial rear view of the dispensing and packaging portion of the machine;

FIG. 5 is a plan view of the depanning and aligning mechanism of the machine;

FIG. 6 is a partial sectional side elevation of the machine illustrating the depanning and aligning mechanism;

FIG. 7 is a side elevation illustrating a gripper unit adapted for depanning and transferring single hamburger buns;

FIG. 8 is an end elevation of the same;

FIG. 9 is a partial sectional end elevation of the gripper actuating mechanism on line 9—9 of FIG. 7;

FIG. 10 is a plan view of a gripper and transfer mechanism adapted for use with single frankfurter rolls and frankfurter roll clusters;

FIG. 11 is a side elevation of the same;

FIG. 12 is an end elevation of the frankfurter roll mechanism;

FIG. 15 is a bottom view of the hamburger bun cluster mechanism illustrating the gripper fingers during gripping action;

FIG. 16 is a side elevation of the same;

FIG. 17 is a sectional plan view of the gripping fingers during gripping action taken on line 17—17 of FIG. 16;

FIG. 18 is a plan view of the dispensing and packaging portion of the machine;

FIGS. 19 and 20 are sectional side elevations illustrating the dispensing mechanism during insertion of the baked goods into a carton;

FIG. 21 is a side elevation of a control unit for air valve operation;

FIG. 22 is a sectional end elevation of the same taken on line 22—22 of FIG. 21;

Figure 13:
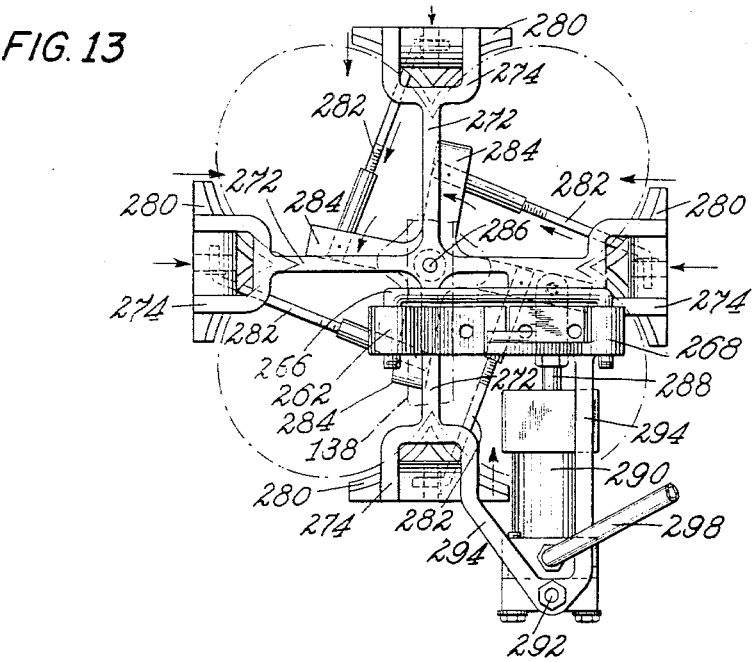
FIG. 13 is a plan view of a gripper and transfer mechanism adapted for use with hamburger bun clusters.
Figure 14:
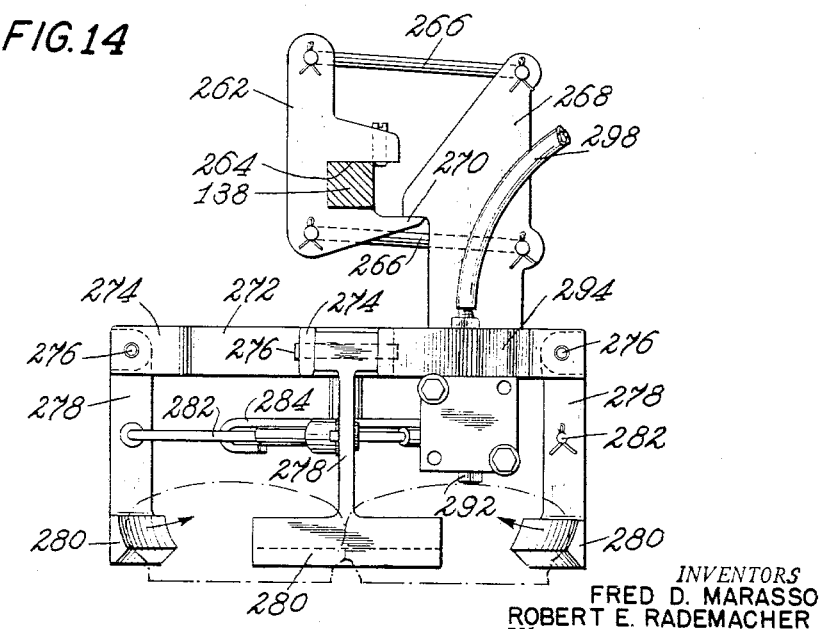
FIG. 14 is an end elevation of the same.

With reference to the drawings, the bun depanner and packer consists of a pan feeding conveyor F, a bun depanning and lifting device D, a bun aligning and conveying mechanism C, a bun slicing device S, a bun dispensing mechanism E and a bun packaging device P.

The entire machine, with the exception of the bun slicing device S and the carton dispensing mechanism of the packaging device P, are driven by a motor 30 (FIG. 2), the shaft 32 of which carries a variable speed pulley 34 of the well known spring-loaded Reeves type. Pulley 34, through a V-belt 36, drives a pulley 38 mounted on the input shaft 40 of a suitable gear reduction unit 42. Mounted on the output shaft 44 of unit 42 is a sprocket 46 which, in turn, drives sprockets 50 and 52 through a suitable chain 48 (FIG. 2). Sprocket 52 is mounted on a cam shaft 54 rotatably supported by suitable bearings held by a member 56 of the main frame 58. Sprocket 50 is mounted on and drives the main drive shaft 60 which is also supported in suitable bearings held by a frame member 62. Pulley 64 is mounted on shaft 60 and, by means of a belt 66, drives a pulley 68 mounted on a shaft 70 which is the drive shaft for the pan feeding conveyor F. Pan feeding conveyor F consists of a suitable frame 72 which is secured by means of adjustable brackets 74 (FIG. 1) to the main frame 58 of the machine. The drive shaft 70 is supported by suitable bearings located in the forward end of frame 72. A pulley 76 is secured to shaft 70 and drives a pair of spaced conveyor belts 78 which run over an idler pulley 80 mounted on a horizontal shaft 82 supported by suitable bearings in frame 72. The pan feed conveyor F is also provided with suitable adjustable pan guide bars 84 which are suspended above the conveyor belts 78 by lugs 86. Each lug 86 is integral with and projects from a threaded sleeve or hub 88. Each guide bar 84 is provided with a pair of spaced lugs 86 and sleeves 88. The sleeves 88 of one guide bar 84 engage with the left hand threaded end portions of a pair of spaced horizontal transverse shafts 90 while the sleeves 88 of the other guide bar 84 engage with the right hand threaded portions on the opposite ends of said transverse shafts 90. Both shafts 90 are supported by suitable bearing brackets secured to the top edges of conveyor frame 72. To one end of each of the shafts 90 is secured a sprocket 92 (FIG. 1) which is connected by a chain 94. Handwheel 96 is fastened to the forward end of one of the shafts 90 to turn shafts 90 in a clockwise or counter-clockwise direction, as desired. It will be understood that, due to the threaded end portions of shafts 90, a turning of handwheel 96 effects a transverse lateral movement of the guide bars 84 either towards or away from each other, providing adjustable guide means for pans of various widths.

Since it is essential to stop the pans intermittently during the depanning operation, the pan infeed conveyor F is provided with a pair of spaced indexing fingers 98, each of which is loosely mounted on a transverse shaft 100. Each shaft 100 is rotatably supported at each end by a suitable bearing lug projecting from a threaded sleeve 102. Each of the two threaded sleeves 102 supporting each transverse shaft 100 engages a threaded longitudinally arranged shaft 104 (FIGS. 5 and 6). Each threaded shaft or spindle 104 is rotatably supported at each end by suitable bearings formed by either gear housings or individual bearing brackets secured to the inner sides of the conveyor frame 72. To one end of each spindle 104 is secured a bevel gear 106 which meshes with a corresponding bevel gear 108. Each pair of bevel gears 108 is mounted on a transverse shaft 110 as shown in FIGS. 5 and 6. Each transverse shaft 110 is rotatably supported at both ends by suitable bearings formed by gear housings 112 secured to the inner face of frame 72. To one end of each transverse shaft 110 is also secured a handwheel 114 (FIGS. 1 and 5). The turning of handwheels 114, through the associated bevel gears 106 and 108 and spindles 104, effect longitudinal back or forward travel of sleeves 102. Since each shaft 100, carried by a pair of sleeves 102, supports a pan indexing finger 98 it will be understood that the indexing fingers 98 may be moved to any desired position in accordance with the size and dimensions of the pans used.

As mentioned heretofore, each indexing finger 98 is loosely mounted on one of the transverse shafts 100. A torsion spring 116 holds finger 98 in engagement with a suitable lug projecting from an actuating arm 118 mounted on the transverse shaft 100. To each transverse shaft 100 is secured a trip lever 120, the free end of which, by means of a tension spring 122, engages with the free end of a stud 124 (FIG. 6). Stud 124 protrudes from a piston within an air cylinder 126 held by a bracket 128 mounted on a suitable lug projecting from the lower side of one of the threaded sleeves 102. The injection of air into the cylinder 126 actuates the piston there-within moving the protruding stud 124 forward to press the trip lever 120 on shaft 100 to swing or move in a counter-clockwise direction as indicated in dotted lines in FIG. 6. A counter-clockwise rotation of shaft 100, of course, causes the finger actuating arm 118 mounted on shaft 100 to move downward, thus lowering the index finger 98 and disengaging it from the pan resting on the continuously driven conveyor belt above. Each index finger 116, at its forward edge, is provided with a projecting curved rod 130 which serves as a guide rod to permit the use of pans of various designs. Each air cylinder 126 is of conventional design and is provided with a flexible hose 132, all of which are connected to a properly timed Bellows Electro air control valve 134 which, in turn, is connected by a suitable tube 136 to a conventional air supply, such as a compressor (not shown).

The depanning operation which removes the buns from the pans which have been indexed into proper location by the mechanism described herein-above is accomplished by a plurality of bun gripping units carried by an oscillating lifter mechanism which lifts the buns from the pans and delivers them to a continuously driven bun conveyor.

The buns are lifted from the pans either one or two rows at a time depending on the type of pans used. The type of lifter units employed to lift the buns or rolls depends on the type of buns or rolls delivered by the pans. Generally, there are four main types of buns and rolls used in this type of operation. They are: the round single hamburger roll, the oblong-shaped frankfurter rolls, the hamburger roll cluster and the frankfurter roll cluster. A hamburger roll cluster comprises four round hamburger rolls arranged in a substantially square pattern held together by a web of dough, while a frankfurter roll cluster includes, as a rule, four oblong frankfurter rolls arranged side-by-side and held together by a web of dough.

Regardless of the type of lifter units used, each particular type is adjustably spaced and arranged on a transverse, preferably square, bar 138 which at each end is detachably held by a U-shaped lug 140 provided with conventional spring-loaded snap-locks (not shown). Such an arrangement permits easy insertion and extraction of the bar 138, allowing rapid conversion from lifter units for one type of roll or bun to lifter units for a different type. From each supporting lug 140 extends a stud 142 which is rotatably supported by the free end of a lifter arm 144. Each arm 144 is mounted to each end of a transverse shaft 146 supported by a pair of suitable bearing brackets 148 mounted on top of the frame 58. To one end of shaft 146 is also secured an actuating arm 150 the free end of which is pivotally connected to one end of a link 152. The other end of link 152 is pivotally connected to a crank arm 154 secured to the gear reduction output shaft 44 (FIG. 2). The rotating crank arm 154, through link 152, arm 150 and shaft 146 transmits oscillatory motion to the lifter arms 144 which carry the lifter units. In order to keep the lifter units in vertical position at all times a lever 156 is secured at one end to the stud 142 of each lifter unit supporting lug 140. The free end of each lever 156 is pivotally connected to one end of a stabilizing bar 158 while the other end of the bar 158 is pivotally attached to a stationary lug 160 mounted on frame 58. The stabilizing bars 158, coacting with the lifter arm 144, form parallelograms which assure a vertical position of the lifter units while being moved through an arc by the oscillating lifter arms 144.

The lifter unit illustrated in FIGS. 7, 8 and 9 is a single unit used primarily for gripping and lifting single round hamburger rolls. It consists of a supporting bracket 162 which is detachably and adjustably secured to transverse square bar 138 mentioned heretofore. A lifter bracket 166 is pivotally connected to the supporting bracket 162 by means of a pair of parallel links 164. The upper portion of bracket 166 is provided with a lug 168 which, by means of a collar 170, supports the upper end of air cylinder 172. From the lower end of cylinder 172 protrudes a piston rod 174 the free end of which is pivotally connected to a gripper finger actuating member 176. Member 176 is loosely supported by a stud 178 projecting from and held by the lower portion of the lifter bracket 166. A gripper finger 182 is pivotally mounted on stud 178 also and is secured to member 176 by means of screw 180. Integral with and horizontally extending from the lower portion of lifter bracket 166 is a lug 184 (FIG. 7). The free end of lug 184 pivotally supports another gripper finger 188, by means of a stud 186, positioning finger 188 in line with and exactly opposite finger 182. Link or connecting rod 190 pivotally connects gripper finger 188 to a suitably shaped extension 192 integral with the member 176 and extending upward therefrom. The top end of the cylinder 172 is suitably connected to a flexible hose 194 which, in turn, is connected to a tube 196 leading to a conventional quick exhaust valve 198, such as manufactured by Schroeder. The quick exhaust valve 198 is connected by a flexible hose 200 to a suitable air control valve 202, such as a Bellows Electro air valve. The electrical control of valve 202 will be described hereinbelow. The air control valve 202 is connected by a tube 204 to a suitable source of air (not shown).

It will be understood that when air is supplied to the cylinder 172 of the lifter unit, the piston rod 174 moves downward and causes member 176 to swing clockwise about its pivot 178. This effects a clockwise movement of gripper finger 182 and through connecting rod 190, a corresponding counter clockwise movement to gripper finger 188, causing a closing or gripping movement of the gripper fingers 182 and 188. To control this gripping motion, as desired, and to protect the rolls from harmful indentations, member 176 is provided with a lug 206 which carries an adjustable stop screw 208. Stop screw 208 engages the bottom side of lug 184 of the lifter bracket, thereby limiting the gripping motion of the gripper fingers. Integral with and extending from the bottom portion of the supporting bracket 162 is a horizontal lug 210 which supports the lifter bracket 166 and permits the gripper fingers carried by the lifter bracket 166 to contact the top face of the pan regardless of possible uneven heights of pans delivered thereto.

The bottom of the cylinder 172 is provided with a suitable compression spring (not shown) which is compressed as the air forces the piston within the cylinder 172 downward. When the air pressure in cylinder 172 is released, the spring (not shown) urges the piston rod 174 upwardly again. Thus the spring (not shown) and the quick exhaust valve 198 effect a rapid opening of the gripper fingers 182 and 188. The number of lifter units employed is preferably equal to the number of buns or rolls in a single row of buns in a pan. In the event that the distance between the rows of buns in the pan is such that two rows of buns can be gripped and lifted at one time the single units described above are so designed that they may be placed side by side and alternately turned 180° such that the gripper fingers are suspended alternately in the front and rear of bar 138 in longitudinal alignment as illustrated in FIGS. 5 and 6.

While the description hereinabove describes the depanning of round hamburger rolls, the present invention may be used to depan oblong frankfurter rolls by simply replacing the hamburger lifter or gripper units described above with gripper units such as illustrated in FIGS. 10, 11 and 12 which are specially designed for gripping and lifting oblong frankfurter rolls. Each of these frankfurter roll gripper units consists of a supporting bracket 212 which is adjustably and detachably secured to the same type of preferably square transverse gripper unit supporting bar 138 mentioned heretofore. A lifter bracket 216 is pivotally connected to supporting bracket 212 by means of a pair of parallel links 214. To the bottom portion of bracket 216 is secured a horizontal gripper arm supporting frame 218. One end of frame 218 rotatably supports a transverse shaft 220 to each end of which is secured a gripper arm 222. Gripper arms 222 at their bottom end are connected by and support a suitably shaped transverse gripper member 224. An actuating lever 226 is secured at one end to shaft 220. The free end of lever 226 is pivotally connected to the forked end of a piston rod 228 projecting from one end of an air cylinder 230. The opposite end of cylinder 230 is pivotally supported by the frame 218 by stud shaft 232. The other end of frame 218 remote from shaft 220 adjustably supports a pair of spaced vertical rods 234. The lower ends of rods 234 are integral with and carry a transverse gripper member 236 which is of substantially the same shape as gripper member 224. Air cylinder 230 is provided with an air inlet nozzle 238 and connected by flexible tube 240 through quick exhaust valve 198 to a suitable air supply as described hereinabove for the hamburger roll lifter units.

The bottom portion of the supporting bracket 212 is also provided with a horizontally extending lug 242 which serves as a support for the gripper arm carrying lifter bracket 216 and enables the gripper members 224 and 236 to contact the top face of each pan delivered thereto although the height of the individual pan may vary.

It will be apparent that when air is supplied to the cylinder 230 the piston therewithin is forced to the top causing actuating lever 226 to swing in a counter-clockwise direction as indicated by the arrow in FIG. 11. The counter-clockwise movement of lever 226 is transmitted to the shaft 220 which, in turn, causes a swinging movement of the gripper member 224 towards the stationary gripper member 236 on rods 234, effecting an endwise gripping of a plurality or portion of a row of frankfurter rolls as indicated in dot and dash lines in FIG. 10. The reason for employing in this unit one stationary and one movable gripper member is to dislocate the frankfurter rolls from the pans during the gripping operation since some frankfurter rolls have a tendency to adhere to the bottom of the pan. When the open gripper units are moved into gripping position adjacent the rolls in a pan, the lower edge of the movable gripper member 224 comes momentarily to rest on the top face of the pan adjacent the rear end of the rolls as indicated in dot and dash lines in FIG. 11. A member 224 moves inwardly through the action of air cylinder 230, the rolls are pushed lengthwise out of the indentation of the pan before being fully gripped between members 224 and 236.

As soon as the air supply to cylinder 230 is released, a suitable compression spring (not shown) located on top of the piston within cylinder 230 pushes piston rod 228 quickly downwardly in concert with the action of the quick exhaust valve 198, thus causing a rapid opening action of the gripper member 224 and a fast release of the rolls.

Depending on the length of the rows of frankfurter rolls to be depanned, any desired member of these gripper units can be mounted on the square transverse supporting bar 138. To change from depanning of hamburger rolls to depanning of frankfurter rolls the operator simply disconnects the air supply hose 200 from the quick exchange valve 198 with which each bar assembly is provided, snaps the hamburger gripper assembly bar 138 out of the U shaped supporting lugs 140 on lifter arms 144, inserts the frankfurter gripper assembly bars in lugs 140 and reconnects the air supply hose 200 to the quick exhaust valve 198. After moving the pan indexing fingers 98 by means of handwheels 114 to bring fingers 98 in proper relation with the frankfurter roll pans, the machine is ready for depanning frankfurter rolls.

The frankfurter roll gripper and lifter unit described above may be used either for rows of single frankfurter rolls or cluster of frankfurter rolls. The latter is usually formed by four rolls side by side connected by a web of baked dough.

Since it happens that during the baking of frankfurter rolls the ends of the rolls in one row creep towards the ends in the next row, causing a slight adhesion therebetween, a removable pneumatic bun clamping device, such as indicated in FIGS. 1 and 5 is provided. The bun clamp consists of a pair of spaced hinge mounted brackets 244 attached to the infeed conveyor frame 72. Brackets 244 are connected by a horizontal cross bar 246 to the top face of which are secured a pair of spaced air cylinders 248. Cylinders 248 are connected at their tops by a tube 250 which, in turn, is connected to a Bellows Electro air control valve 254 by a hose 252. Valve 254 is connected by a tube 256 to a suitable source of air supply (not shown). From the bottom of each air cylinder 248 and protruding through a hole in the cross bar 246 projects a piston rod 258 from the bottom of which is suspended a suitably shaped clamp plate 260. On the bottom of and within the cylinder 248 below the piston is located a suitable compression spring (not shown) which normally holds the piston in its uppermost position in the cylinder 248. Thus piston rod 258 normally holds the clamping plate 260 above and out of contact with the rolls in the pans passing beneath. As soon as the indexing fingers 98 have contacted a pan and the gripper members on the gripper and lifter unit have descended to engage the rolls in the pan, air is supplied to the cylinders 248 causing the piston within cylinders 248 to move downwardly together. Clamping plate 260 thus engages the top face of the row of rolls therebeneath. The row engaged by plate 260 is the row directly in back of the row of rolls to be engaged and lifted from the pan by the gripper members of the lifter unit. Should one or more rolls in these rows be adhered together, they are gently torn apart during the depanning action without danger of pulling rolls out of the row of rolls in back of the one presently being depanned.

As soon as the air supply to the cylinders 248 is interrupted, the compression spring (not shown) within the cylinder urges the piston and the clamping plate 260 upwardly, thereby disengaging the rolls in the pan beneath plate 260. The action of the clamping plate 260, is properly timed and synchronized with the operation of the pan indexing fingers 98 and the action of the gripper and lifter units of the depanning device.

As mentioned heretofore, the present device can also be used for depanning clusters of hamburger rolls by simply substituting the single hamburger roll or frankfurter roll gripper and lifter units with units especially designed for clusters of hamburger rolls. One of the gripper and lifter units for clusters of hamburger rolls is illustrated in FIGS. 13, 14, 15, 16 and 17 and consists of a supporting bracket 262 having a horizontal square slot 264 for attaching bracket 262 to one of the square transverse gripper unit supporting bars 138. A lifter bracket 268 (FIG. 14) is pivotally connected to supporting bracket 262 by means of a pair of parallel links 266. Bracket 268 rests freely on a lug 270 extending from the lower portion of bracket 262. To the lower portion of lifter bracket 268 is secured a cross-shaped member 272. The free ends of each of the four lugs of member 272 forms a fork 274. From each fork 274 a gripper arm 278 is pivotally suspended by means of a stud 276. The bottom end of each gripper arm 278 is provided with a curved V-shaped jaw 280. The center portion of each of the four arms 278 is pivotally connected to the free end of one leg of a cross shaped gripper arm actuating member 284 by means of a suitable connecting rod 282. Member 284 is pivotally supported at its center by a vertical stud 286 projecting from the center of the stationary cross-shaped member 272. One leg of the cross shaped gripper arm actuating member 284 is pivotally connected at one end to the free end of a piston rod 288 (FIG. 15) attached to a piston (not shown) within an air cylinder 290. Air cylinder 290, at one end, is pivotally supported by a vertical stud 292 projecting from a suitably shaped lug 294 which is integral with the stationary cross-shaped member 272. On top of the piston (not shown) within cylinder 290 is located a suitable compression spring (not shown) which normally keeps the piston in the back portion of cylinder 290. When the piston (not shown) is in this position, the gripper arms 278 are radially spread out or open as illustrated in FIG. 13. The back portion of cylinder 290 is provided with an air nozzle 296 to which is attached a flexible tube 298 which leads to quick exhaust valve 198 with which each bar 138 is provided.

When air is introduced into cylinder 290 the piston moves forward and compresses the spring (not shown) on top of cylinder 290, moving piston rod 288 forward. This forward movement of the piston rod 288 causes a counter-clockwise rotation of cross-shaped gripper arm actuating member 284 which, in turn, through connecting rods 282, affects a radial inward movement of the four gripper arms 278, causing jaws 280 to contact and grip the hamburger roll cluster as illustrated in FIG. 16 where the hamburger roll cluster is indicated with dot and dash lines.

The lifting movement imparted to the gripper units is effected through oscillating arms 144 in the same manner as the single hamburger roll and frankfurter roll grippers described hereinabove. As soon as the air is interrupted to cylinder 290, the compression spring (not shown) within the cylinder forces the piston and rod 288 backward, causing a clockwise rotation of the cross-shaped gripper arm actuating member 284. Actuating member 284 through connecting rods 282 results in a radial outward movement of the gripper arm 278 and jaws 280 and, consequently, in a release of the hamburger roll cluster. Of course, several of these hamburger roll cluster gripping units may be mounted side by side on one transverse bar 138 in a manner similar to the gripper units described heretofore.

All gripper units are swung through an arc by means of the oscillatory lifter arms 144 as illustrated in FIG. 6, and the depanned buns are released above and permitted to drop onto the bun conveying and aligning mechanism E shown in FIGS. 5 and 6. The bun conveyor consists of a plurality of longitudinally spaced endless chains 300 which carry a plurality of evenly spaced transverse rods 302. Endless chains 300 are supported and driven by suitable sprockets 304, the idler sprockets of which are loosely mounted on the transverse shaft 146, while the driving sprockets are secured to a transverse shaft 306 (FIGS. 3, 18 and 19) supported by suitable bearings mounted on the frame 58 of the machine. The transverse conveyor drive shaft is driven continuously through a suitable sprocket (not shown) which, in turn, is driven through a chain 308 (FIGS. 2 and 3), by another sprocket mounted on shaft 310, which is supported by suitable bearings in framework 58. To shaft 310 is secured another sprocket 312 which through a chain 314 is driven by a suitable sprocket (not shown) on the drive shaft 60.

Slightly above the bun receiving end of the bun conveyor is located the bun aligning device which is employed for the purpose of properly aligning and spacing the buns dropped onto the conveyor to assure that said buns, when reaching the slicing device S, are in the desired position to affect precise slicing of the buns.

The aligning device consists of a transverse cross bar on rod 316 (FIGS. 5 and 6) which at each end is detachably secured to a lug 318, which is fastened to and projects upwardly from, one end of a horizontal guide bar 320 (FIGS. 1, 2, 5 and 6). Each of the two guide bars 320 at the opposite end is pivotally connected to a suitable slot provided at the top end of an arm 322 (FIG. 2), and both arms 322 at their bottom end are secured to a transverse shaft 324 rotatably supported by bearing brackets 326 mounted on frame 58. To shaft 324 is also secured a cam lever 328, the free end of which carries a cam roller 330, which engages with a suitable cam 332 mounted on the cam shaft 54. The two guide bars 320 are slidingly supported in suitable bearing lugs 334 forming part of the framework 58. The transverse aligning bar 316 is provided with a plurality of evenly spaced rods or prongs 336 (FIGS. 1, 5 and 6) which project at right angles from the transverse aligning bar 316 and longitudinally with, but slightly above, the conveyor. The free ends of the longitudinal prongs 336 are provided with suitable ears or lobes 338 which are provided for the purpose of precisely positioning the buns on the conveyor with respect to the distance between each bun in each row so the slicer will slice each bun in a precise manner.

The bun aligning device operates as follows: The cam 332 through cam lever 328, arms 322 and guide bars 320 imparts longitudinally reciprocating motion to the transverse and longitudinal aligning rods 316 and 336, respectively. The transverse bar 316 dwells in its backmost position when one or two rows of buns are dropped on the moving bun conveyor, but immediately thereafter moves forward at a faster rate than the speed of the conveyor, thus catching up with the row of buns and moving them slightly forward on the conveyor. This accomplishes a transverse alignment of the buns while the longitudinal prongs provide longitudinal alignment. The aligning bars 316 and 336 then move backward again while the buns are carried forward and thus pass the ears or lobes 338 of the prongs 336 which parts the buns in the precise position for the slicer.

After the aligning operation the buns are carried in aligned formation by the conveyor through the slicer or slitter S where the buns are sliced by a plurality of horizontally rotating knives 340 (FIG. 2) usually in such a manner as to leave a hinge between the upper and lower portion of the sliced bun. The slicing device S is a conventional unit available commercially from the Alto Machine Co., York, Pennsylvania, and forms no part of this invention. The slicer unit S is hingedly mounted to the top of frame 58 and suspended above the conveyor by means of a pair of piston rods 342 projecting from a pair of pivotally mounted vertical hydraulic cylinders 344. Cylinders 344 are connected by means of tubes 346 and 348 (FIG. 2) to a suitable source of air supply (not shown). Thus the unit S may be raised to a non-operative position above the conveyor, as shown in FIG. 2 when no slicing of the buns is desired. The rotating knives 340 within the unit S are driven by an independent motor 350 mounted on top of the unit housing 352. Within the unit S are mounted a number of longitudinally arranged and properly spaced top guide belts (not shown) which hold the buns firmly on the conveyor during slicing operation. Since these top guide belts must be driven and move at the same speed as the conveyor a sprocket 354 mounted on the shaft 310 drives a second sprocket 358 (FIG. 2) through a chain 356. Sprocket 358 is mounted on a transverse shaft 360 supported by suitable bearings within the slicer unit S. Shaft 360 constitutes the drive shaft for the top guide belts located within unit S. The chain 356 runs over a spring-mounted chain tightener sprocket 362 to facilitate raising and lowering of the slicer unit S.

As mentioned heretofore, the slicing unit S illustrated in FIG. 2 preferably slices the buns only partially so that the upper and lower half of each bun is still connected by a "hinge" of dough. In case it is desired to slice the buns all the way through, a band slicer H (FIG. 2) is mounted across the machine and secured to the top of the framework 58. An endless saw band (not shown) travels transversely across and above the conveyor and parallel therewith while the buns are held down on the moving conveyor by a plurality of longitudinally spaced belts 364 traveling at the same speed as the conveyor. The entire unit is driven by a suitable gear reduction motor 366 and may be raised or lowered by means of a pair of vertical spindles 368 actuated by suitable handwheels 370.

After passing either through the slicing unit S or the band slicing unit H the buns are carried by the conveyor to the bun dispensing mechanism E illustrated in FIGS. 3, 4, 18, 19 and 20. The dispensing unit E consists chiefly of a bun guiding and funnelling device and a bun inserting device. Since the buns are usually packaged in two layers there are two devices of each type. One funnelling device re-orients and arranges the buns for the bottom layer while the other funnelling device re-orients and arranges the buns for the top layer. This, of course, is also true for the inserting devices, one inserts the bottom layer while another inserts the top layer.

The funnelling device consists of two sets of vertically suspended endless guide belts 372 arranged above the conveyor in diagonal fashion as illustrated in FIG. 18. The forward pulleys 374 are closer together than the rearward pulleys 376 thus forming a funnel-shaped continuously moving channel with its side walls (belts 372) moving at the same speed as the bottom of the channel formed by the bun conveyor. The channel thus formed is divided along exact longitudinal center line by a plurality of vertical lugs 378 secured to an endless chain 380 (FIGS. 4, 18 and 19). Belt 38 is suspended above the bun conveyor and driven from one end of the same speed as the conveyor by means of a sprocket 382 mounted on a transverse shaft 384. Shaft 384 is supported by suitable bearings in the framework 58 and a central supporting bar 386 which in turn is held by two transverse rods 388 and 390 secured to the framework 58. The forward end of chain 380 is supported by an idler sprocket 392 (FIG. 19) pivotally held by a stud shaft 394 mounted on a lug 396 suspended from and secured to the bar 386. Shaft 384 is continuously driven by means of a sprocket 398 mounted thereon. Sprocket 348, in turn, is driven by a sprocket 402 through a chain 400. Sprocket 402 is mounted on the conveyor drive shaft 306 (FIG. 3). Chain 400 is also led over an idler sprocket 404 and imparts driving motion to another sprocket 406 mounted on a transverse shaft 408. To transverse shaft 384 are secured two bevel gears 410 each of which meshes with a bevel gear 412 (FIG. 18). Each bevel gear 412 is secured to the top end of one of the side guide belts driving pulleys 376 which are pivotally supported by vertical stud shafts secured to suitable supporting plates 414 extending horizontally from the framework 58. The front pulley 374 of side guide belts 372 are pivotally held by suitable vertical studs 416 each of which is adjustably mounted to the free end of an arm 418 which extends horizontally from and is adjustably secured to the framework 58. Thus the front end of the two conveyor channels V and W may be widened or narrowed as desired. The continuously drive channel walls are employed for the purpose of closing the lateral spaces between the individual buns in the row. Since the walls are driven synchronously with the conveyor no disturbance of the lateral alignment of the row is experienced. Thus when the rows reach the mouth or the dispensing end of the channels, the rows of buns are close together and in lateral alignment ready to be engaged by the inserting devices.

The inserting devices comprise reciprocating pusher plates 420 and 422 which push and insert the rows into an open box waiting at the bun dispensing stations M and N (FIGS. 18, 19 and 20). The boxes K which are open on top and on one side are forwarded to the dispensing station by a suitable transverse conveyor 424 which will be described hereinbelow. Between the end of the bun conveyor channel V, mentioned above, and the transverse box conveyor 424 is a horizontal stationary bridge plate 426. Bridge plate 426 leads to the bun dispensing station M (FIG. 19) while between the end of the bun conveyor channel W and transverse conveyor 424 is an inclined bridge plate 428 which leads to the bun dispensing station N (FIG. 20). Both bridge plates 426 and 428 are suitably secured to the framework. Each plate 426 and 428 is provided with one stationary side guide rail 430 and 432, respectively, and one adjustable side guide rail 434 and 436, respectively (FIG. 18). The adjustable guide rails 434 and 436 are mounted on brackets 438 and 440, respectively, both of which are adjustably secured to and suspended from the transverse rod 390 (FIG. 18). The horizontal bridge plate 426 forms the guide channel for the buns to be dispensed to the bottom of the box while the inclined bridge plate 428 forms the channel for guiding the buns for delivery on top of the first layer already in the box. Since the pusher plates 420 and 422 which dispense the buns from the conveyor channels V and W, respectively, into the boxes K are of identical construction, only one of the pusher units and their operating mechanism will be described and the parts of both pusher units will have identical reference characters. Each rectangularly shaped pusher plate is adjustably mounted to a supporting plate 442 (FIGS. 19 and 20) which is integral with an upright lug 444 the free top end of which by means of a link 446 is pivotally connected to a stud shaft 448 carried by a guide shoe 450. Shoe 450 is supported by and slidingly engages with a horizontal guide rail 452. The guide rails 452 for both pusher units at their front end are secured by means of suitable lugs to the transverse rod 390 while the other end of each rail 452 engages with and is supported by the transverse rod 388 (FIG. 18). To the bottom portion of each upright lug 444 is pivotally connected the free end of an arm of a bell crank lever 454 which forms a parallelogram with link 446. The free end of the other arm of the bell crank lever is pivotally connected to the free end of a piston rod 456. The bell crank lever proper is pivotally mounted on a stud 458 held by and projecting horizontally from the lower front portion of the guide shoe 450. The piston rod 456 projecting from an air cylinder 460 is integral with a piston (not shown) within cylinder 460. Each air cylinder 460 at the opposite end from which the piston rod protrudes, is pivotally mounted on a stud 462 carried by and projecting horizontally from the guide shoe 450, and at this same end, a flexible air hose 464 is connected to the bottom of said cylinder. The flexible air hoses 464 of both cylinders are connected to a transverse hollow shaft 466 pivotally supported at each end by the upper free end of an arm 468, one of each of which is located at each side of the machine. Each arm 468 is mounted to one end of a transverse shaft 470 rotatably supported by suitable bearings in framework 58. The transverse hollow shaft 466 pivotally connects with one end of a pair of spaced connecting rods 472, the other end of each of which is pivotally connected to the rear end portion of one of the guide shoes 450. One end of the transverse hollow shaft 466 is provided with a suitable plug, and the other end by means of a suitable tube or hose 474, is connected to an air control valve 478, such as a Bellows Electro (FIG. 4). Valve 478 in turn is connected to a source of air supply (not shown) by a suitable tube 478. Each of the two arms 468 is pivotally connected by means of a link 480 to a crank arm 482, both of which are mounted on the continuously rotating shaft 408 described heretofore. It is self evident that the continuously rotating crank arms 482 through links 480 impart oscillating motions to the arms 468 and the transverse hollow shaft 466 carried by the same. Since shaft 466 through links 472 is connected to the guide shoes 450 on rails 452, oscillating motion of said shaft 466 effects reciprocating motion of guide shoes 450, and, since guide shoes 450 carry the pusher plate assembly, reciprocating motion is also imparted to the latter. It is also apparent that when air is introduced to cylinders 460, the pistons within move forward and through their respective piston rods 456 in conjunction with bell crank levers 454 effect a downward movement of the respective pusher plates 420 and 422. When the air supply is shut off, a compression spring (not shown) located on top of the piston within each cylinder 460, forces the piston backward again and thus effects a raising of the pusher plate.

The bun dispensing action of each pusher plate assembly is as follows: The mechanisms of the machine are preferably operated in timed relationship such that the pusher plates 420 and 422 are momentarily dwelling in a backmost and raised position at the forward end of the bun conveyor channels V and W waiting for a row of buns to pass beneath. As a row of buns pass beneath, the pusher plates are lowered and immediately moved in a forward direction so that the downwardly projecting portion of each pusher plate engages the trailing end of the row of buns. Plates 420 and 422 then push the buns rapidly forward over the bridge plates 426 and 428 respectively and into the open box K which is momentarily stopped to permit insertion of the buns therein. After inserting the buns into the box, the pusher plates are immediately raised and moved backward to their starting position to engage a succeeding row of buns forwarded by the conveyor for insertion into boxes.

As mentioned heretofore, the empty boxes or cartons K are forwarded to the bun dispensing stations M and N by a transverse conveyor 424 which in turn receives the boxes from a conveyor 484 which is part of a box or carton dispenser R illustrated in FIGS. 23 and 24 and will be described hereinafter.

The transverse conveyor 424 consists of a plurality of narrow endless belts 486 which are continuously driven by means of a pulley 488 at one end and supported by an idler pulley 490 at the other. Idler pulley 490 is rotatably supported by a horizontal shaft 492 secured to a suitable conveyor frame 494 mounted on the main framework 58 of the machine. The driving pulley 488 (FIG. 4) is secured to a shaft 496 (FIGS. 4 and 18) which is rotatably supported by suitable bearing brackets also mounted on the framework 58. To shaft 496 is secured a bevel gear 498 which meshes with a bevel gear 500 fastened to the continuously driven transverse shaft 306.

In order to stop the cartons during the bun inserting operation, the conveyor 424 is provided with suitable carton arresting and indexing fingers 502 (FIGS. 3, 18, 20 and 29) which at the proper time protrude upwardly through the spaces between belts 486 and engage the leading end of the carton as illustrated in FIG. 18. Indexing fingers 502 are mounted on a supporting member 504 which is pivotally supported by a horizontal stud shaft 506 (FIG. 20). Shaft 506 at one end is adjustably secured in a horizontal slot 508 provided in the front portion of conveyor 494. To the bottom portion of the finger supporting member 504 is secured a suitably shaped control member 510. Member 510 is provided with a forked extension 512 which loosely engages with a horizontal rod 514, both ends of which are bent at right angles to form a U. The free ends of this U-shaped rod 514 are secured to a horizontal shaft 516 which is rotatably supported by a pair of suitable bearing brackets 518 mounted on the framework 58 of the machine. A cam lever 520 is also secured to shaft 516; the free end of cam lever 520 carrying a cam roller 522 which engages with a cam 524 mounted on the continuously rotating transverse shaft 408. It will be apparent that the cam 524, through cam lever 520 and shaft 516, imparts timed oscillating motion to the U-shaped rod 514. Rod 514 in turn through members 510 and 504, transmits up and down motion to the indexing fingers 502. In case it is desired to incapacitate the indexing fingers 502, a latch lug 526 (FIG. 20) pivotally suspended from the frame of the conveyor, is moved into engagement with the U-shaped rod 514, thus keeping fingers 502 in their down position.

As illustrated in FIG. 18, the indexing fingers 502 are so located as to engage the leading end of the carton aligned with the conveyor channel W at the bun dispensing station N during the bun inserting operation. The stopping of the carton of course, arrests the succeeding carton which is then aligned with the bun conveyor channel V at the bun inserting station M. FIGURE 19 illustrates the manner in which a double row of buns is pushed by plate 420 from the bun conveyor over the horizontal bridge plate 426 and into the open carton. After the insertion of the buns in a carton at station M, the partially filled carton is then permitted to move with the conveyor 424, but is again arrested at the bun inserting station N (FIG. 20) where a double row of buns is pushed by the plate 422 over the inclined bridge plate 428 onto the first layer of buns previously inserted at station M.

To assure that the pusher plate 422, when pushing buns over the inclined bridge plate 428 into the boxes, follows an inclined path corresponding to the incline of plate 428 (FIG. 20), there is provided an inclined cam rail 449 (FIG. 20) secured to the rail 452. Cam rail 449 engages with a cam roller 451 carried by an arm 453 which is secured to shaft 448. One end of link 446 is mounted on shaft 448 also, thus forming a double lever consisting of arm 453 and link 446. By this arrangement, when roller 451 engages the cam rail 449, it raises the opposite end of the double lever and thus effects a gradual raising of the pusher plate 422 serving the bun inserting station N.

In order to prevent any tumbling of the second layer of buns and damage thereto while being pushed on top of the first layer, the dispensing station N is provided with an oscillating shuffle plate 528. Shuffle plate 528, during bun inserting operation, emerges from beneath the inclined bridge plate 428 to form an extension of the latter, thus providing a smooth bridge from the leading edge of plate 428 to a point half way over the double row of the first layer of buns already in the carton as illustrated in FIG. 20.

The oscillating shuffle plate 528 is secured to one end of a bar 530 while the other end of the latter is mounted to the free upper end of an arm 532 (FIG. 20) loosely mounted on a shaft 534 rotatably held by a suitable bearing bracket 536 attached to the frame 58. To shaft 534 is secured a cam lever 538 the free end of which carries a roller 540 which engages with a cam 542 secured to the continuously rotating transverse shaft 408. Cam lever 538 is also provided with a suitably shaped flange 544 (FIGURE 20) to which, by means of a clamp plate 546 is adjustably secured the shuffle plate actuating arm 532. Thus there is provided means for adjusting the bridging distance of the shuffle plate 528 from the leading edge of the plate 428 to the desired point in the carton. The pusher plate 422 which pushed the second layer of buns over the shuffle plate 528 into the carton, of course, dwells momentarily in its forward most position to permit withdrawal of the shuffle plate 528, before returning to its own starting position.

As mentioned heretofore and illustrated in the drawings the empty boxes or carton K are topless and arrive at the dispensing station with one side flap down and in line with the bottom of each box. After the boxes are filled and released by the indexing fingers 502 the filled boxes are carried by the conveyor 424 past a curved rod 548 (FIGURE 18) which acts as a plow and causes an upward bending of the extended side flap, thus effecting a closing of the box.

In order to keep the filled box firmly on the conveyor belt 486 and prevent a raising or tilting of said box while passing the curved side flap folding rod 548, a continuously driven top compression or hold-down belt 549 engages with the top of the filled carton as illustrated in FIGURE 18. Belt 549 is located parallel to and above the delivery end of conveyor 424 and is held by a pair of pulleys 547 rotatably supported by a frame 551. Frame 551 is adjustably secured by means of a bracket 553 to the main frame 58 of the machine. One of pulleys 547 is driven by a horizontal shaft 555 (FIGURE 4) rotatably supported by a suitable bearing bracket 557 mounted on the frame 58. Shaft 555 is driven through a pair of gears 559 from a shaft 561 (FIGURE 18) which is also rotatably supported by bracket 557. Shaft 561 carries a sprocket 563 which is driven through a chain 565 by a sprocket 567 (FIGURE 4) mounted on the conveyor drive shaft 496.

If desired these topless boxes are then forwarded to a suitable wrapping machine (not shown) which envelops the boxes with a wrapper. Conveyor 424 is also provided with a suitable adjustable side guide rail 550 and a rail 552 (FIGURE 18) which holds the open side flap L of the boxes down on the conveyor until the boxes are filled with buns at the dispensing stations M and N as described heretofore.

Figure 23:
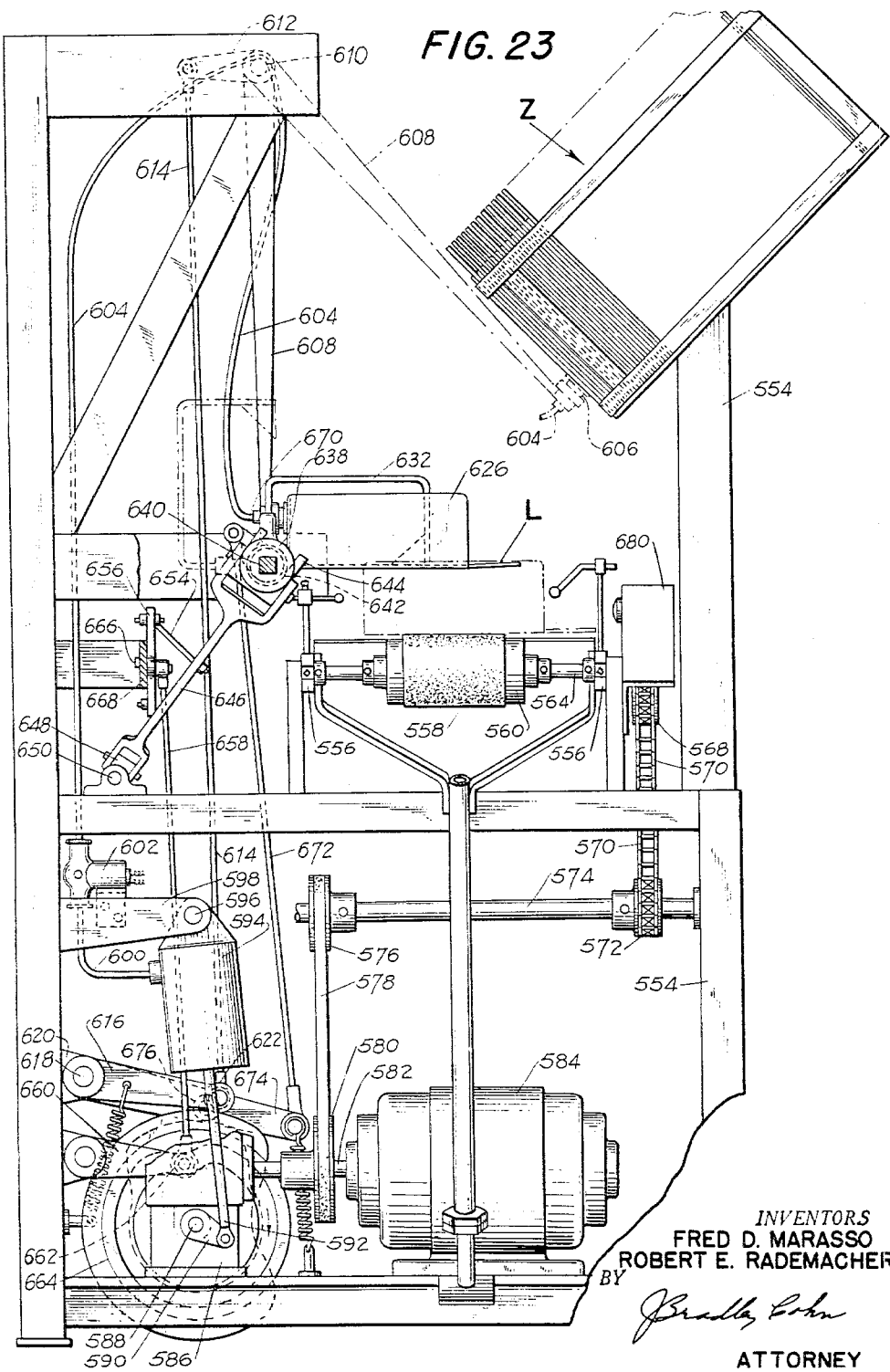
FIG. 23 is an end elevation of the carton dispensing and opening mechanism in conjunction with a forwarding conveyor.
Figure 24:
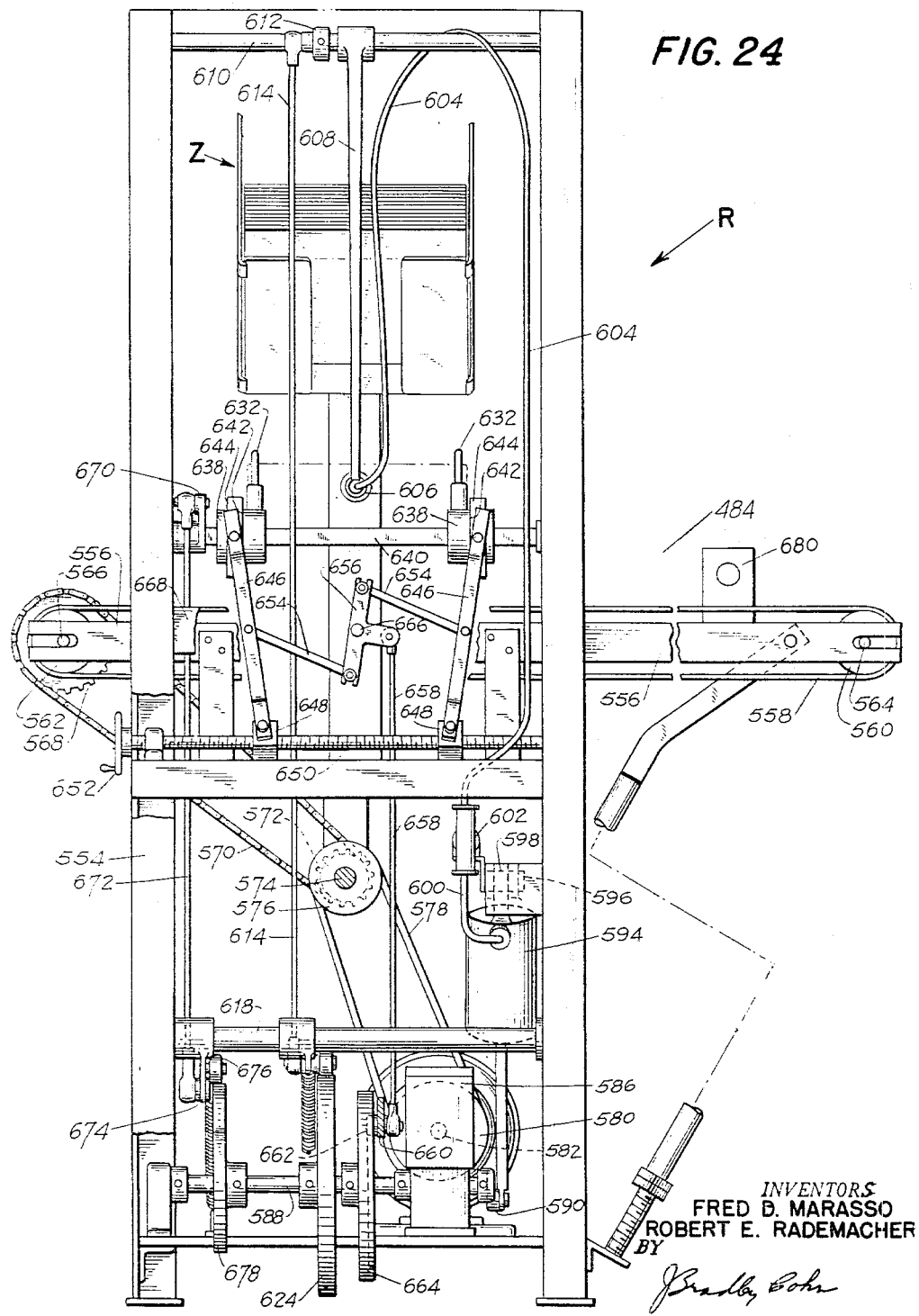
FIG. 24 is a side elevation of the same.
Figure 25:
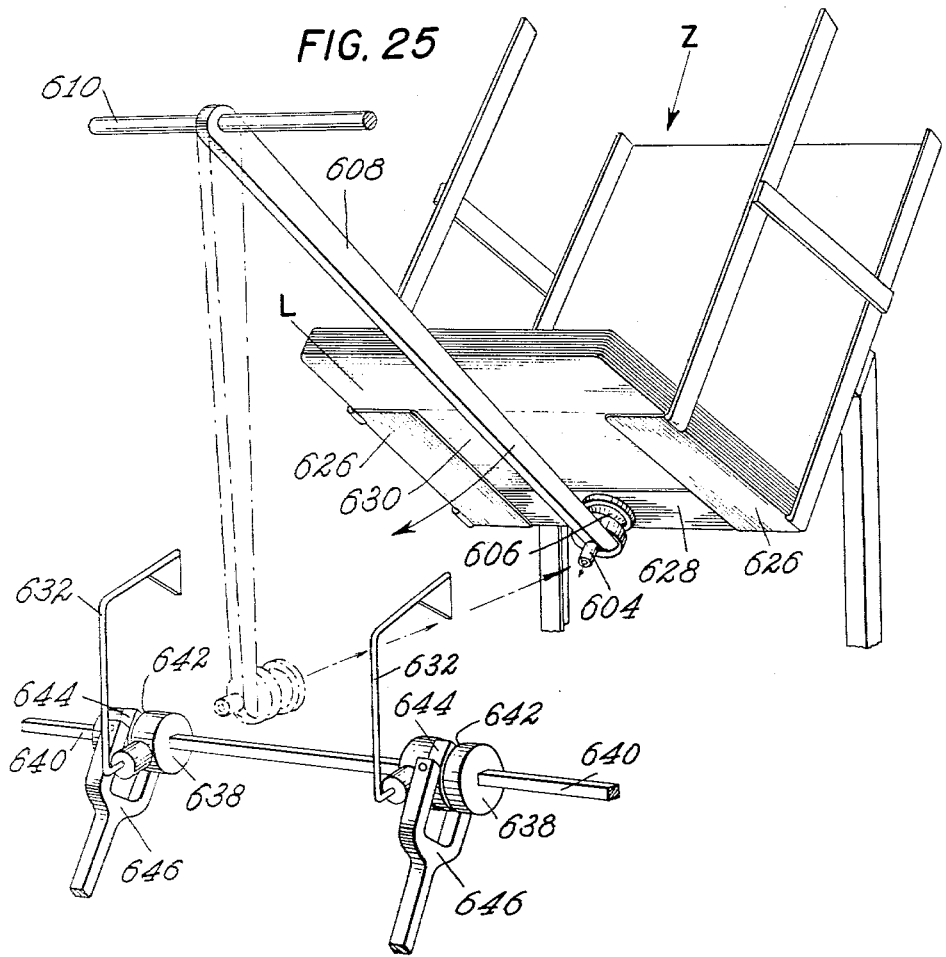
FIGS. 25, 26, 27 and 28 are perspective views illustrating the successive steps employed in the dispensing and opening of the carton to be forwarded to the packaging machine.
Figure 26:
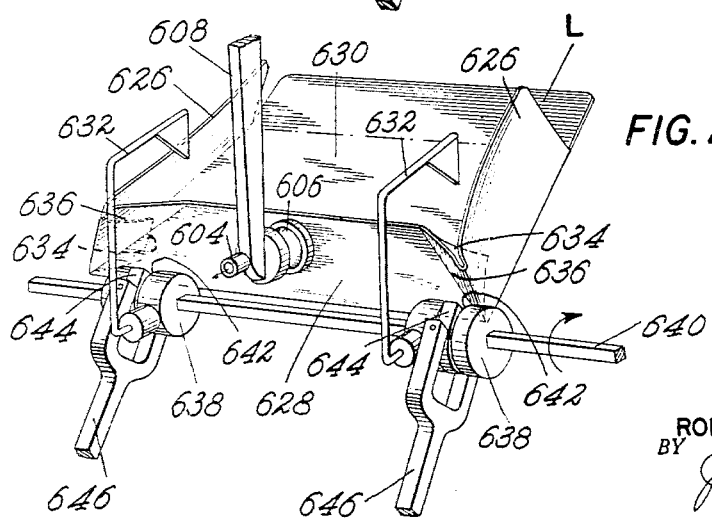
Figure 27:
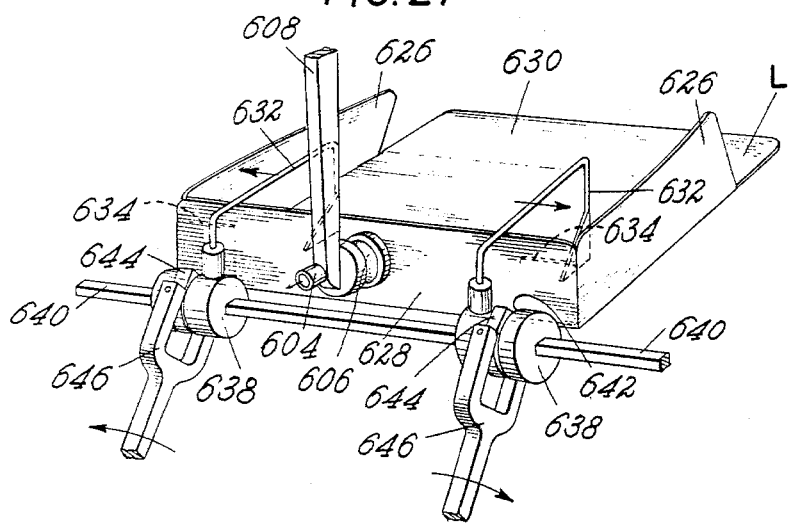
Figure 28:
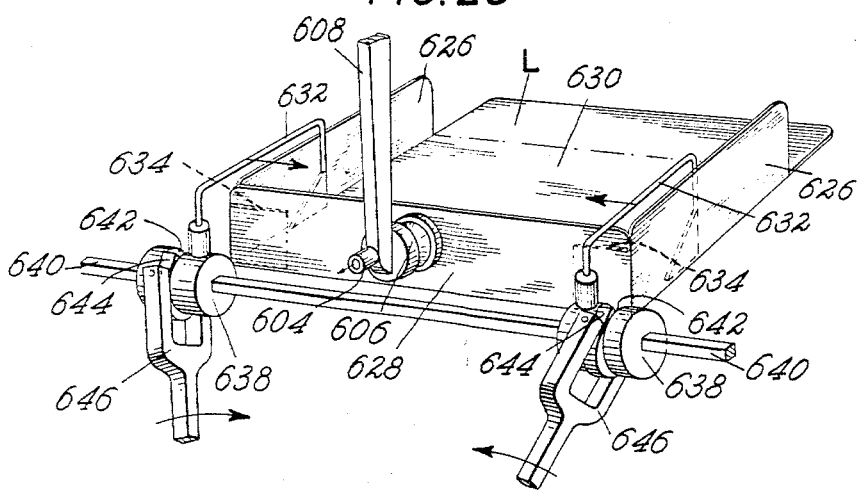
Figure 29:
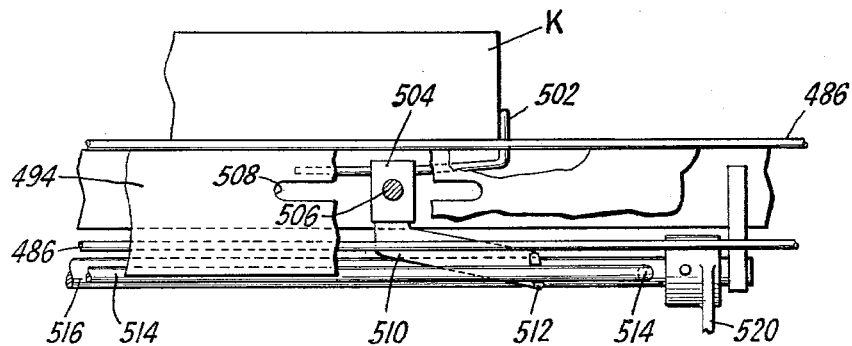
FIG. 29 is a partial end elevation, partly in section, illustrating the carton indexing device.
Figure 30:
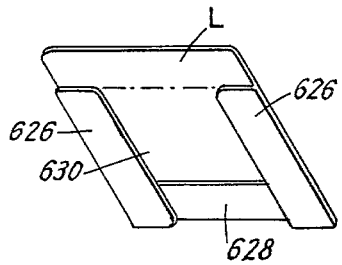
FIG. 30 is a carton blank, shown in perspective.
Figure 31:
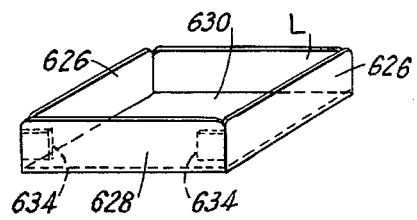
FIG. 31 is a carton assembled, shown in perspective.

As mentioned above, the boxes K to be filled are forwarded to the conveyor 424 by the conveyor 484 which is part of the box dispensing device R illustrated in FIGS. 18, 23 and 24. This box dispensing device R consists of a frame 554 (FIGURES 23 and 24) which supports a suitable frame 556 of the conveyor 484 and a suitably formed magazine Z. Magazine Z is equipped to hold a stack of folded boxes or carton blanks K as illustrated in FIG. 23. The conveyor 484 consists of an endless belt 558 which is led over and supported by an idler pulley 560 and driven by a pulley 562 (FIGURE 24). Idler pulley 560 is rotatably supported by a shaft 564 which is mounted at both ends in a suitable slot in the forward end of the conveyor frame 556. The driving pulley 562 is mounted on a shaft 566 rotatably supported by suitable bearings in conveyor frame 556. To shaft 566 is secured a sprocket 568 which through a chain 570 is connected to a sprocket 572 mounted on a continuously driven shaft 574 supported by suitable bearings mounted in the frame 554. To shaft 574 is mounted a pulley 576 which through a belt 578 is driven by a pulley 580 mounted on the motor shaft 582 of a motor 584 secured to the frame 554. The motor shaft 582 is also connected to and drives a gear reduction unit 586 the output shaft 588 of which on one side serves as a cam shaft while to another portion of said shaft protruding from the opposite of said unit is mounted a crank arm 590. Crank arm 590 is pivotally connected to the lower free end of a piston rod 592 which is integral with a piston (not shown) within a cylinder 594 pivotally supported by and suspended from a stud shaft 596 held by a suitable bracket 598 secured to the frame 554. The top portion of said cylinder by means of a flexible tube 600 is connected to a suitable electrically controlled cut-out valve 602 which also by means of another flexible tube 604 is connected to a suction head 606 carried by and secured to the free end of a dispensing arm 608 mounted on an oscillating horizontal shaft 610 rotatably supported by suitable bearings in the frame 554. To shaft 610 is also secured an activating lever 612 the free end of which is secured by means of a connecting rod 614 to a cam lever 616 loosely supported by a shaft 618 which is supported by suitable brackets 620 mounted on frame 554. Cam lever 616 carries a cam roller 622 which engages with a cam 624 mounted on the shaft 588. Cam 624 is employed for the purpose of transmitting oscillating motion to the dispensing arm 608 while each down stroke of the piston in cylinder 594 activated by the crank arm 590 creates suction which is transmitted through tube 600, valve 602 and tube 604 to the suction head 606 carried by the arm 608. The suction supply is so timed that when the arm 608 as seen in FIG. 23, swings in an anticlockwise direction suction is supplied to the head 606 shortly before the latter reaches the folded cartons in the magazine Z, so that when said head 608 contacts the bottom carton of the folded stack of cartons in the magazine, said bottom carton adheres to the head 606 on arm 608 as indicated in dotted lines in FIGURE 23. The cartons in the magazine Z, as shown in FIG. 25, are folded flat with the two end flaps 626 folded over the back side flap 628 of the carton, while the front side flap L is unfolded and is coplanar with the bottom 630 as illustrated in FIGURE 25. When the suction head 606 reaches the cartons in the magazine it contacts the outside face of the back side flap 628 as illustrated in FIGURE 25. The arm 608 then moves in a clockwise direction and causes the carton adhering to the suction head to be pulled out and freed from the magazine Z. When the carton now held only by the back flap 628 is free of the magazine, the rest of the body of the carton due to its own weight will drop down and away from arm 608 and thus effect a partial opening of said carton as illustrated in FIGURE 26. When the arm 608 reaches its vertical starting position said arm dwells with the outside of the back side flap 628 of the carton still adhering to the suction head 606. During this dwelling period a pair of L-shaped fingers 632 enter the carton from the open top, contact the bottom 630 of said carton and press the latter downward until said bottom is at right angles to the back side flap 628 still held by the suction head 606 as illustrated in FIGURE 27. The fingers 632 then move toward the end flaps 626 as indicated by arrows in FIGURE 27 and press against the inside of said end flaps until they assume a straight upright position as illustrated in FIGURE 28, and thus effect a complete opening of the formerly folded carton. A pair of stiffening tabs 634 which are folded extensions of the end flaps 626 and which are glued to the inside of the originally folded end portions 636 (FIGURE 26) snap in place against the inside of the back side flap 628, and assist in preventing the carton from collapsing after opening. Fingers 632 then retreat again towards the center and then out of the open box after which the suction is released from the suction head 606 and the carton is permitted to drop onto the conveyor belt 558 which carries it to the conveyor 424 as described heretofore.

The L-shaped box opening fingers 632 are mounted on sleeve 638 both of which are supported and slidingly engage with a square horizontal shaft 640 which at both ends is rotatably supported by suitable bearings in frame 554. Each sleeve 638 is provided with an annular groove 642 which engages with a forked member 644. Each forked member 644 in turn is pivotally mounted at the forked end portion of an arm 646 which at the bottom end is pivotally secured to a block 648 provided with a threaded horizontal bore by means of which said block engages with a horizontal threaded spindle 650 (FIGURES 23 and 24), which is rotatably supported by suitable bearings mounted on the frame 554. To one end of spindle 650 is secured a hand wheel 652. Half of the spindle is provided with right hand thread while the other half is provided with left hand thread and by the same token one of the blocks 648 has a right hand threaded bore while the other has a left hand threaded bore, thus providing adjusting means for the finger actuating arms 646. Both arms 646 by means of a pair of links 654 are pivotally connected to the cross bar of a T shaped member 656, while the bar of said member which is vertical when the member is upright is pivotally connected to the upper end of a connecting rod 658. The lower end of connecting rod 658 is pivotally connected to a cam lever 660 which carries a cam roller 662 engaging with a cam 664 on shaft 588. The T-shaped member 656 at its central portion is pivotally held by a stud 666 which is held by a cross frame member 668 secured to frame 554. While cam 664 through rod 658 member 656 and links 654 transmits oscillating motion to arms 646 the latter in turn impart horizontal reciprocating motion to sleeves 638 and consequently to fingers 632. Due to the T-shaped member 656 the horizontal reciprocating motion of fingers 632 are towards and away from each other. To the horizontal square shaft 640 is secured an arm 670 (FIGURES 23 and 24) which through a connecting rod 672 is pivotally connected to a cam lever 674 carrying a cam roller 676 engaging with a cam 678 mounted on shaft 588. Cam 678 through cam lever 674, connecting rod 672 and arm 670 provides oscillating motion to said square shaft 670 and consequently to fingers 632.

Since the cartons are dispensed and forwarded by conveyor 484 to conveyor 424 at a faster rate than the boxes can be filled an electric eye 680 is mounted adjacent the conveyor 484 and is employed to receive a light beam across said conveyor. When said light beam is broken by empty cartons remaining on said conveyor, the electric eye and its electrical control (not shown) will cause current to be transmitted to the vacuum cut-out valve 602 which in turn will be actuated in such a manner as to prevent vacuum to reach the suction head 606 on arm 608. The latter, of course, continues to oscillate but will not pull cartons from the magazine Z.

Since it is sometimes desirable not to box clusters of hamburger or frankfurter buns but simply place them bottom to bottom and then envelop them in a transparent wrapper, the machine may be provided with a bun turnover device such as illustrated in FIGURES 30, 31, 32 and 33. This device is located at the bun dispensing end of the machine and may be suitably attached to the conveyor frame 494 of the conveyor 424. The bun turnover device consists of an oscillating platform 682 provided on one side with an upright flange 684 while the other side is suitably secured to a hub 686 (FIGURE 30) mounted on a horizontal shaft 688 projecting from and supported by suitable bearings of a housing 690, the bottom portion of which is suitably secured to the conveyor frame 494. Fastened to shaft 688 within housing is a gear 692 (FIGURE 31) which meshes with a vertical gear rack 694 which at its lower end by means of a link 696 is pivotally connected to the free end of an arm 698 pivotally supported by a horizontal stud shaft 700 held by a suitable bracket 702 mounted on frame 494.

Since the cartons are dispensed and forwarded by conveyor 484 to conveyor 424 at a faster rate than the boxes can be filled an electric eye 680 is mounted adjacent the conveyor 484 and is employed to receive a light beam across said conveyor. When said light beam is broken by empty cartons remaining on said conveyor, the electric eye and its electrical control (not shown) will cause current to be transmitted to the vacuum cut-out valve 602 which in turn will be actuated in such a manner as to prevent vacuum to reach the suction head 606 on arm 608. The latter, of course, continues to oscillate but will not pull cartons from the magazine Z.

In order to properly synchronize the action of all Bellows Electro air control valves in this machine so that air pressure to the various mechanisms may be supplied and released at the proper time a control unit 710 such as illustrated in FIGS. 21 and 22 is provided. The control unit 710 consists of a housing or frame 712 which in suitable bearings supports a cam shaft 714 to one end of which is secured a sprocket 716. Sprocket 716 through a chain 718 is driven by a sprocket 720 which is secured to the output shaft 44 of the gear reduction unit 42 illustrated in FIG. 2 of the drawings. To cam shaft 714 are secured cams 722, 724, 726, 728, 730 and 732 which are employed for the purpose of actuating micro switches 723, 725, 727, 729, 731 and 733 respectively. All micro switches are located beneath their respective cams and are provided with conventional actuator arms 734 (FIGURE 22) all of which are supported by a suitable rod 736 held in housing 712.

As mentioned heretofore the action of the pan indexing fingers 98 is controlled by the Bellows Electro air valve 134 (FIGURES 1 and 6) which through suitable wires are connected with the micro switch 727 which in turn is actuated by the cam 726. By the same token the action of the bun clamp plates 260 shown in FIGURE 1 is controlled by the Bellows Electro air valve 254 which through suitable wires is connected to the micro switch 729 which in turn is actuated by the cam 728. Therefore, when cams 726 and 728 depress their respective micro switches the valves 134 and 254 respectively are energized during that period of time permitting air pressure to pass through the same and effect the actuation of the pan indexing fingers 98 and the bun clamp plates 260 as described heretofore.

Since it is essential to keep the bun gripper fingers of the gripper units open during half of their operating cycle and closed during the other half, the Bellows Electro air valve 202 (FIGURES 1 and 6) which controls the opening and closing of said gripper fingers is provided with a two way controlled solenoid. Therefore, cam 732 through micro switch 733 causes valve 202 to open and cam 730 through 731 effects the closing of the same.

As described heretofore the up and down motion of the pusher plates 420 and 422 of the bun dispensing device is effected through air flow controlled by the Bellows Electro air valve 478 illustrated in FIGURE 4. Since it is essential that said pusher plates during their forward travel remain in a downward position while during their backward movement they must remain in a raised position, the valve 478 is also provided with a two way controlled solenoid which is actuated by cam 722 through micro switch 723 to effect an opening of valve 478 while cam 724 through micro switch 725 controls the closing of the same. The opening of valve 478, of course, permits air pressure to reach the air cylinders 460 (FIGURE 18) which tends to keep said pusher plates in a downward position while moving forward during their bun dispensing operation as described heretofore.

What is claimed is:

1. A carton dispensing and forming mechanism comprising a source of supply of pre-folded carton blanks, means for extracting single blanks from said source of supply, said means including a suction member, means mounting said suction member for rotation in a limited arc to and from said source of supply, said extracting means being operative, upon rotation to said source of supply, to engage a single upturned side panel of said carton blank and, during rotation from said source of supply, while withdrawing said blank, to permit it to partially unfold, due to the effect of gravity, and to thereby partially orient other panels of said blank, fingers, means movably mounting said fingers adjacent the limit of rotation of said extracting means away from said source of supply, and means for moving said fingers downwardly and outwardly into said partially unfolded blank to complete said carton assembly.

2. The invention as defined in claim 1 wherein said suction member engages the major side panel of said blank, said fingers engage the minor side panels of blank and said fingers actuate said minor side panels from a partially open to a fully open position only.

References Cited by the Examiner
UNITED STATES PATENTS

| | | | |
|---|---|---|---|
| 2,598,569 | 5/1952 | Levkoff | 93—53 |
| 2,699,712 | 1/1955 | Meyer-Jagenberg et al. | 93—53 |
| 2,747,473 | 5/1956 | Monroe et al. | 93—53 |
| 2,750,856 | 6/1956 | Ferguson et al. | 93—53 |
| 2,811,296 | 10/1957 | Long | 229—16 |
| 2,946,495 | 7/1960 | Lange | 229—16 |

FRANK E. BAILEY, *Primary Examiner.*

FRANKLIN T. GARRETT, *Examiner.*